(12) United States Patent
Nitta et al.

(10) Patent No.: US 7,453,475 B2
(45) Date of Patent: Nov. 18, 2008

(54) OPTICAL DISPLAY DEVICE, PROGRAM FOR CONTROLLING THE OPTICAL DISPLAY DEVICE, AND METHOD OF CONTROLLING THE OPTICAL DISPLAY DEVICE

(75) Inventors: Takashi Nitta, Chino (JP); Junichi Nakamura, Shiojiri (JP); Shoichi Uchiyama, Shimosuwa-machi (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 657 days.

(21) Appl. No.: 11/082,855

(22) Filed: Mar. 18, 2005

(65) Prior Publication Data

US 2005/0212786 A1      Sep. 29, 2005

(30) Foreign Application Priority Data

Mar. 23, 2004  (JP) ............................ 2004-084634

(51) Int. Cl.
  *G09G 5/10*  (2006.01)
  *G02F 1/00*  (2006.01)
  *G02F 1/01*  (2006.01)
  *G03B 21/00* (2006.01)

(52) U.S. Cl. ................... 345/690; 345/88; 345/589; 345/600; 348/744; 348/750; 348/751; 353/31; 353/34; 353/73; 359/237; 359/245; 359/276

(58) Field of Classification Search ............... 345/76, 345/77, 81–84, 88, 89, 90, 102, 204, 690–693, 345/589–591, 600–605; 348/744, 750, 751; 353/31, 34, 37, 73; 359/237, 242, 245, 249, 359/276–278

See application file for complete search history.

(56) References Cited

U.S. PATENT DOCUMENTS 6,809,717 B2 * 10/2004 Asao et al. ................... 345/102

(Continued)

FOREIGN PATENT DOCUMENTS

JP   A-2001-100689   4/2001

(Continued)

OTHER PUBLICATIONS

H. Seetzen et al.; "A High Dynamic Range Display Using Low and High Resolution Modulators," SID Symposium 2003; pp. 1450-1453.

(Continued)

*Primary Examiner*—Henry N Tran
(74) *Attorney, Agent, or Firm*—Oliff & Berridge, PLC

(57) ABSTRACT

Exemplary embodiments of the invention provide an optical display device that modulates light from a light source in two stages through an optical modulator and a luminance adjusting element to expand the luminance dynamic range and the number of the gradation levels of a display image, that allows the picture quality to be enhanced, and that is suitably applied to display an image according to the resolution of the luminance adjusting element having a higher resolution than the optical modulator. Exemplary embodiments provide a projection type display device that converts RGB pixel values in HDR display data into YCbCr pixel values, selects the maximum $Y_{max}$ from corresponding YCbCr values on a pixel-basis in a color modulation light valve, and calculates average values $Cb_{ave}$ and $Cr_{ave}$. The device converts YCbCr pixel values consisting of these values into RGB pixel values, determines the transmittance T1 of each of the pixels in the color modulation light valve using the RGB value, then determines the transmittance T2 of each of the pixels in the luminance modulation light valve based on the transmittance T1, and determines control values for the light valves based on the values T1 and T2.

20 Claims, 15 Drawing Sheets

U.S. PATENT DOCUMENTS

| | | | |
|---|---|---|---|
| 6,923,546 B2 * | 8/2005 | Kurematsu | 353/97 |
| 7,234,822 B2 * | 6/2007 | Uchiyama et al. | 353/102 |
| 7,236,285 B2 * | 6/2007 | Uchiyama et al. | 359/242 |

FOREIGN PATENT DOCUMENTS

| | | |
|---|---|---|
| JP | A-2002-099250 | 4/2002 |

OTHER PUBLICATIONS

F. Drago et al.; "Adaptive Logarithmic Mapping for Displaying High Contrast Scenes," Eurographics 2003; vol. 22, No. 3; 8 pages.

P. Debevec et al.; "Recovering High Dynamic Range Radiance Maps from Photographs," University of California at Berkeley; 10 pages.

* cited by examiner

700R

| control value | 0 | 1 | 2 | 3 | 4 | 5 |
|---|---|---|---|---|---|---|
| transmittance | 0.004 | 0.007 | 0.010 | 0.013 | 0.018 | 0.026 |
| control value | 6 | 7 | 8 | 9 | 10 | 11 |
| transmittance | 0.04 | 0.07 | 0.10 | 0.16 | 0.24 | 0.35 |
| control value | 12 | 13 | 14 | 15 | | |
| transmittance | 0.45 | 0.52 | 0.57 | 0.6 | | |

| control value | 0 | 1 | 2 | 3 | 4 | 5 |
|---|---|---|---|---|---|---|
| transmittance | 0.003 | 0.006 | 0.009 | 0.012 | 0.017 | 0.025 |
| control value | 6 | 7 | 8 | 9 | 10 | 11 |
| transmittance | 0.038 | 0.06 | 0.09 | 0.15 | 0.23 | 0.33 |
| control value | 12 | 13 | 14 | 15 | | |
| transmittance | 0.44 | 0.52 | 0.57 | 0.6 | | |

FIG. 8

$T_{18}=(T_{11}\times 1+T_{12}\times 4+T_{13}\times 4+T_{14}\times 16)/25$

OPTICAL DISPLAY DEVICE, PROGRAM FOR CONTROLLING THE OPTICAL DISPLAY DEVICE, AND METHOD OF CONTROLLING THE OPTICAL DISPLAY DEVICE

BACKGROUND

Exemplary embodiments of the present invention relate to a device that modulates light from a light source through a plurality of optical modulators and displays an image. Exemplary embodiments of the invention more particularly relate to an optical display device to increase the luminance dynamic range and the number of gradation levels, and a program and a method to control the optical display device.

The related art includes optical display devices such as an LCD (Liquid Crystal Display), an EL (electroluminescent) display, a plasma display, a CRT (Cathode Ray Tube), and a projector that provide considerably improved picture qualities. Further, the resolution and color gamut are nearing levels almost comparable to human visual perception. Regarding the luminance dynamic range, however, the reproducing range is still nothing more than about 1 nit to $10^2$ nit, and the number of gradation levels is still generally 8 bits. Meanwhile, the luminance dynamic range by human visual perception is about $10^{-2}$ nit to $10^4$ nit, and human luminance discrimination capability is about 0.2 nit, which can be interpreted into 12 bits in terms of gradation levels. When images displayed at the present optical display devices are viewed in terms of the visual sensitivity characteristics, the luminance dynamic range is particularly narrow, and the gradation at the shadowed part or highlighted part is insufficient. Accordingly the viewer finds the image wanting reality or strength.

In the field of computer graphics (hereinafter simply as "CG") for example for movies and games, the related art includes a trend to provide display data with a luminance dynamic range or the number of gradation levels close to human visual perception (hereinafter as High Dynamic Range "HDR" display data) in order to make the graphics look more real. However, the optical display devices to display the kind of graphics do not provide sufficient performance. Further, what should be expressed by the original CG content cannot fully be expressed.

The next generation OS (Operating System) is expected to employ the 16-bit color space, and its luminance dynamic range and the number of gradation levels are considerably greater than the present 8-bit color space. Therefore, there is a demand for optical display devices that can fully take advantage of the 16-bit color space.

Among the optical display devices, a projection type display such as a liquid crystal projector and a DLP™ projector (Digital Light Processing, a trademark of Texas Instruments Incorporated) can display images on a large screen and effectively reproduce more real and dynamic images. In this field of the related art technology, the following proposal has been made in order to address and/or solve the above discussed and/or other problems.

As for a high dynamic range, the related art includes projection type display devices, as disclosed in for example, Japanese Patent Laid Open No. 2001-100689, Japanese Patent Laid Open No. 2002-99250 and Helge Seetzen, Lorne A. Whitehead, Greg Ward, "A High Dynamic Range Display Using Low and High Resolution Modulators," SID Symposium 2003, pp. 1450-1453 (2003), hereinafter "Seetzen". The related art display devices include a light source, an optical modulator that modulates the luminance in each of the wavelength regions for three RGB primary colors in the wavelength region of the light, and a luminance adjusting element that modulates the luminance in the entire wavelength region of the light. Light from the light source is modulated by the luminance adjusting element to have a desired luminance distribution, and its optical image is formed on the display surface of the optical modulator for color modulation, so that secondary modulated light is projected. The pixels in the optical modulator and the luminance adjusting element are independently controlled in response to first and second control values determined based on HDR display data. As the optical modulator, a transmittance modulating element is used. In the element, pixels or segments can have their transmittances independently controlled, and its two dimensional transmittance distribution can be controlled. A typical example of the element is a liquid crystal light valve. Instead of the transmittance modulating element, a reflectance modulating element can be employed, a typical example of which is a DMD (Digital Micromirror Device).

Now, assume that an optical modulator has a transmittance of 0.2% for dark display and a transmittance of 60% for bright display. The single optical modulator has a luminance dynamic range of 60/0.2=300. The related art projection type display device is comparable to an optical series-arrangement of optical modulators having a luminance dynamic range of 300, and therefore the luminance dynamic range to be achieved is 300×300=90,000. The same applies to the number of gradation levels, and by arranging 8-bit gradation optical modulators optically in series, the number of gradation levels can be greater than 8 bits.

The related art includes other projection type display devices that provide a high luminance dynamic range, for example a projection type display device as disclosed by Seetzen and a display device as disclosed by Japanese Patent Laid Open No. 2002-99250.

In related art documents Japanese Patent Laid Open No. 2001-100689 and Japanese Patent Laid Open No. 2002-99250, an LCD is used as the optical modulator, and an illumination device that can be modulated such as an LED or fluorescent lamp is used as the luminance adjusting element.

SUMMARY

HDR display data allows a high luminance dynamic range (that cannot be provided in a related art image format such as sRGB) to be provided, and stores pixel values representing the pixel luminance levels of all the pixels of the image. In the HDR display data, if the luminance level of a pixel p is Rp, the pixel transmittance corresponding to the pixel p in the optical modulator is T1, and the pixel transmittance corresponding to the pixel p in the luminance adjusting element is T2, the following expressions (1) and (2) are established:

$$Rp = Tp \times Rs \quad (1)$$

$$Tp = T1 \times T2 \times G \quad (2)$$

wherein Rs is the luminance of the light source, G is the gain (both values are constant), and Tp is the optical modulation ratio.

As can be understood from the expressions (1) and (2), there are countless combinations of T1 and T2 for the pixel p. However, T1 and T2 should not be arbitrary values. Depending on how to determine the values, the picture quality might degrade and therefore T1 and T2 should appropriately be determined in consideration of the picture quality.

Seetzen only discloses the concept of how to provide a high luminance dynamic range using two optical modulators.

Seetzen does not disclose how to determine the control values for the pixels (i.e., T1 and T2) in the optical modulators and the luminance adjusting element based on the HDR display data nor how to control the device using the control values. Therefore, the picture quality could degrade in some cases depending on how to determine T1 and T2 and how to control using the determined control values.

Meanwhile, Japanese Patent Laid Open No. 2002-99250 discloses in detail a method of expanding the luminance dynamic range by controlling the luminance of the back light and the transmittance of the LCD. However, Japanese Patent Laid Open No. 2002-99250 does not disclose any specific method of expanding the luminance dynamic range in connection with other arrangements than the combination of the back light and the LCD for the optical modulator and the luminance adjusting element or an arrangement in which the optical modulator and the luminance adjusting element have different resolutions.

Exemplary embodiments of the present invention are directed to a solution to the problems associated with the related art techniques yet to be solved. It is an object of exemplary embodiments of the present invention to provide an optical display device that modulates light from a light source in two stages through an optical modulator and a luminance adjusting element to expand the luminance dynamic range and the number of the gradation levels of a display image and that is suitably applied to display an image according to the resolution of the luminance adjusting element having a higher resolution than the optical modulator. Exemplary embodiments further provide program to control the optical display device, and a method to control the optical display device.

Inventive Exemplary Aspect 1

In order to address and/or solve the above described object, an optical display device according to Inventive Exemplary Aspect 1 has an optical modulator that has a plurality of pixels whose optical propagation characteristics can be controlled independently and a luminance adjusting element that has a plurality of pixels whose optical propagation characteristics can be controlled independently. The pixels in said optical modulator and the pixels in said luminance adjusting element are arranged to optically correspond at m:n wherein m and n are integers and m<n or n>m. The device modulates light from a light source through said optical modulator and said luminance adjusting element and displays an image. The device includes:

an average value calculating device to calculate the average value or weighted average value of color component values on a color-basis in pixel values corresponding to said n pixels based on said display image data;

a luminance selecting device to select a luminance value corresponding to each of the pixels in said optical modulator among luminance component values in the pixel values corresponding to said n pixels based on said display image data;

an optical propagation characteristic determining device to determine the optical propagation characteristic of each of the pixels in said optical modulator based on the result of calculation by said average value calculating device and the result of selection by said luminance selecting device; and a control value determining device to determine a control value for each of pixels in said optical modulator based on the optical propagation characteristics determined by said optical propagation characteristic determining device.

In this way, the average value or weighted average value of color component values on a color-basis in pixel values corresponding to said n pixels can be calculated by the average value calculating device based on said display image data. The luminance selecting device can select a luminance value corresponding to each of the pixels in said optical modulator among luminance component values in the pixel values corresponding to said n pixels based on said display image data. The optical propagation characteristic determining device can determine the optical propagation characteristic of each of the pixels in said optical modulator based on the result of calculation by said average value calculating device and the result of selection by said luminance selecting device. The control value determining device can determine a control value for each of pixels in said optical modulator based on the optical propagation characteristics determined by device optical propagation characteristic determining device.

Therefore, the optical propagation characteristic of each of the pixels in the optical modulator is determined using RGB values having only their color components averaged. Therefore, mainly the color components of an image can be reproduced in the optical modulator having less pixels than the luminance adjusting element. In addition, mainly the luminance component of the image is reproduced in the luminance adjusting element with a resolution higher than the optical modulator. Therefore, high picture quality image display in terms of visual perception can be carried out. Human visual perception has a lower resolution to colors than to luminance, and therefore mainly the luminance component is reproduced in the luminance adjusting element with the high resolution, so that image display with a resolution equal to that of the luminance adjusting element can be carried out.

The light from the light source is modulated in two stages through the optical modulator and the luminance adjusting element, so that a relatively high luminance dynamic range and an increased number of gradation levels can be provided.

Herein, the optical propagation characteristic refers to a characteristic that affects the propagation of light such as the transmittance, reflection, and refraction characteristics of light. This also applies to an optical display device according to Inventive Exemplary Aspects 2, 11 and 12, a control program for an optical display device according to Inventive Exemplary Aspects 13, 14, 20, and 21, and a method of controlling an optical display device according to Inventive Exemplary Aspects 22, 23, 32, and 33.

The optical modulator and the luminance adjusting element according to exemplary embodiments include an element such as a liquid crystal light valve and a DMD whose optical propagation characteristics such as transmittance and reflection on a pixel-basis can be controlled. This also applies to the optical display device according to Inventive Exemplary Aspects 2, 11, and 12, a program to control an optical display device according to Inventive Exemplary Aspects 13, 14, 20, and 21, and a method to control an optical display device according to Inventive Exemplary Aspects 22, 23, 32, and 33.

As typical color systems to separate a luminance component and color components, there are the YCbCr color system, the YIQ color system, the YUV color system and the like for various TV video systems and video recording systems. This also applies to an optical display device according to Inventive Exemplary Aspects 2, 11, and 12, a program to control an optical display device according to Inventive Exemplary Aspects 13, 14, 20, and 21, and a method to control an optical display device according to Inventive Exemplary Aspects 22, 23, 32, and 33.

Inventive Exemplary Aspect 2

In order to address and/or achieve the above described object, an optical display device according to Inventive Exemplary Aspect 2 has an optical modulator that has a plurality of pixels whose optical propagation characteristics can be controlled independently and a luminance adjusting element that has a plurality of pixels whose optical propagation characteristics can be controlled independently. The pixels in said optical modulator and the pixels in said luminance adjusting element are arranged to optically correspond at m:n wherein m and n are integers and m<n or n>m, and said device modulates light from a light source through said optical modulator and said luminance adjusting element and displays an image.

The device includes a first pixel value converting device to convert RGB values corresponding to n pixels in said luminance adjusting element corresponding to m pixels in said optical modulator into first pixel values in which the luminance component and color components of the RGB values are separated based on display image data having the pixels values including the RGB values;

an average value calculating device to calculate the average value or weighted average value of said color component values on a color-basis among said first pixel values corresponding to said n pixels;

a luminance selecting device to select luminance values corresponding to the m pixels in said optical modulator from the said luminance component values among said first pixel values corresponding to said n pixels;

a second pixel value converting device to convert second pixel values into RGB values, said second pixel values consisting of a result of calculation by said average value calculating device and a result of selecting by said luminance selecting device;

an optical propagation characteristic provisionally determining device to provisionally determine the optical propagation characteristic of each of the pixels in said luminance adjusting element;

a first optical propagation characteristic determining device to determine the optical propagation characteristic of each of the pixels in said optical modulator based on the optical propagation characteristic provisionally determined by said optical propagation characteristic provisionally determining device and the result of conversion by said second pixel value converting device;

a first control value determining device to determine a control value for each of the pixels in said optical modulator based on the optical propagation characteristics determined by said first optical propagation characteristic determining device;

a second optical propagation characteristic determining device to determine the optical propagation characteristic of each of the pixels in said luminance adjusting element based on said display image data; and a second control value determining device to determine a control value for each of the pixels in said luminance adjusting element based on the optical propagation characteristic determined by said second optical propagation characteristic determining device.

In this way, the first pixel value converting device can convert RGB values corresponding to n pixels in said luminance adjusting element corresponding to m pixels in said optical modulator into first pixel values in which the luminance component and color components of the RGB values are separated based on display image data having the pixels values including the RGB values. The average value calculating device can calculate the average value or weighted average value of said color component values on a color-basis among said first pixel values corresponding to said n pixels. The luminance selecting device can select luminance values corresponding to the m pixels in said optical modulator based on said luminance component values among said first pixel values corresponding to said n pixels. The second pixel value converting device can convert second pixel values consisting of the result of calculation by said average value calculating device and the result of selection by said luminance selecting device into RGB values.

The optical propagation characteristic provisionally determining device can provisionally determine the optical propagation characteristic of each of the pixels in said luminance adjusting element. The first optical propagation characteristic determining device can determine the optical propagation characteristic of each of the pixels in said optical modulator based on the optical propagation characteristics provisionally determined by said optical propagation characteristic provisionally determining device and the result of conversion by said second pixel value converting device. The first control value determining device can determine a control value for each of the pixels in said optical modulator based on the optical propagation characteristic determined by said first optical propagation characteristic determining device.

The second optical propagation characteristic determining device can determine the optical propagation characteristic of each of the pixels in said luminance adjusting element based on said display image data. The second control value determining device can determine a control value for each of the pixels in said luminance adjusting element based on the optical propagation characteristic determined by said second optical propagation characteristic determining device.

Therefore, the RGB values having only their color components averaged are used to determine the optical propagation characteristic of each of the pixels in optical modulator. Therefore mainly color components in an image can be reproduced in the optical modulator with less pixels than the luminance adjusting element. In addition, mainly the luminance component of the image can be reproduced in the luminance adjusting element with a higher resolution than the optical modulator. Therefore, high quality image display in terms of human visual perception can be provided. Human visual perception has a lower resolution to colors than to luminance, and therefore mainly the luminance component is reproduced in the luminance adjusting element with the high resolution, so that image display with a resolution equal to the luminance adjusting element can be carried out.

The light from the light source is modulated in two stages through the optical modulator and the luminance adjusting element, so that a relatively high luminance dynamic range and an increased number of gradation levels can be provided.

Inventive Exemplary Aspect 3

According to Inventive Exemplary Aspect 3, in the optical display device according to Inventive Exemplary Aspect 2, said first pixel value converting device converts said RGB values into first pixel values including a Y value representing the luminance component of the pixel, a Cb value representing color difference for blue in the pixel, and a Cr value representing color difference for red in the pixel.

In this way, RGB values can readily be separated into the luminance component and the color components using a related art conversion formula used to convert RGB values into YCbCr values.

Inventive Exemplary Aspect 4

According to Inventive Exemplary Aspect 4, in the optical display device according to Inventive Exemplary Aspect 2 or 3, said luminance selecting device selects one of the maximum, intermediate, and minimum values among the luminance component values in said first pixel values corresponding to said n pixels as a luminance value corresponding to each of the pixels in said optical modulator.

In this way, a luminance value can be selected simply in three stages depending on the averaged color. Therefore, the luminance value can be selected more easily.

Inventive Exemplary Aspect 5

According to Inventive Exemplary Aspect 5, in the optical display device according to any one of Inventive Exemplary Aspects 2 to 4, the second optical propagation characteristic determining device determines the optical propagation characteristic of each of the pixels in said luminance adjusting element based on said display image data and the optical propagation characteristics determined by said first optical propagation characteristic determining device.

In this way, the optical propagation characteristic of the luminance adjusting element can be determined in view of the optical propagation characteristic of the optical modulator determined by the first optical propagation characteristic determining device.

Inventive Exemplary Aspect 6

According to Inventive Exemplary Aspect 6, the optical display device according to Inventive Exemplary Aspect 5 further includes: a third pixel value producing device to produce third pixel values corresponding to the n pixels in said luminance adjusting element based on said luminance component values corresponding to said n pixels in said first pixel values and the result of calculation by said average value calculating device; and a third pixel value converting device to convert said third pixel values into RGB values.

The second optical propagation characteristic determining device determines the optical propagation characteristic of each of the pixels in said luminance adjusting element based on the result of conversion by said third pixel value converting device and the optical propagation characteristic determined by said first optical propagation characteristic determining device.

In this way, the third pixel value producing device produces third pixel values corresponding to the n pixels in said luminance adjusting element based on said luminance component values corresponding to said n pixels in said first pixel values and the result of calculation by said average value calculating device. The third pixel value converting device converts said third pixel values into RGB values. The second optical propagation characteristic determining device determines the optical propagation characteristic of each of the pixels in said luminance adjusting element based on the result of conversion by said third pixel value converting device and the optical propagation characteristic determined by said first optical propagation characteristic determining device.

Therefore, the optical propagation characteristics for said n pixels is determined from RGB values directly based on the luminance component in the pixel values corresponding to the n pixels in the luminance adjusting element. Therefore the luminance component of the image can be reproduced more precisely in the luminance adjusting element. In this way, image display with higher picture quality can be carried out.

Inventive Exemplary Aspect 7

According to Inventive Exemplary Aspect 7, in the optical display device according to any one of Inventive Exemplary Aspects 2 to 6, when the pixel values of the display image data corresponding to the n pixels in said luminance adjusting element are the same, said first optical propagation characteristic determining device determines the optical propagation characteristic of each of the pixels in said optical modulator based on the optical propagation characteristic provisionally determined by said optical propagation characteristic provisionally determining device and the pixel values in said display image data.

In this way, when the pixel values of the display image data corresponding to the n pixels in said luminance adjusting element are the same, the number of operation to calculate the optical propagation characteristic of a corresponding pixel in the optical modulator can be reduced, which results in reduction of a processing load.

Inventive Exemplary Aspect 8

According to Inventive Exemplary Aspect 8, in the optical display device according to any one of Inventive Exemplary Aspects 2 to 7, said optical modulator and said luminance adjusting element both have said pixels arranged in a matrix, the number of pixels in said luminance adjusting element is a integral multiple of the number of pixels in said optical modulator both in the row and column directions, and m pixels in said optical modulator and n pixels in said luminance adjusting element are arranged to regularly and optically correspond.

In this way, m pixels in said optical modulator and n pixels in said luminance adjusting element are arranged to regularly and optically correspond, and therefore the operation processing for determining the optical propagation characteristic of each of the pixels in the optical modulator and the luminance adjusting element can readily be carried out, which increases the processing speed. The circuit configuration and optical structure can be simplified and thus, the cost can be reduced.

Inventive Exemplary Aspect 9

According to Inventive Exemplary Aspect 9, the optical display device according to Inventive Exemplary Aspect 8 includes a plurality of said optical modulators corresponding to light in said RGB colors, and m pixel in each said optical modulator and n pixels in said luminance adjusting element are arranged to regularly and optically correspond.

In this way, m pixels in a plurality of optical modulators corresponding to a plurality of light beams in different wavelength regions such as light in the three primary colors and n pixels in the luminance adjusting element are arranged to regularly correspond. Therefore, in color image display, for example as compared to a single optical modulator with rotating color filters, light in the three primary color can be modulated separately using the optical modulators, which enhances the processing speed. Since a related art liquid crystal display device (an LCD, a liquid crystal light valve, and the like) can be used as the luminance adjusting element, the cost can be reduced.

Inventive Exemplary Aspect 10

According to Inventive Exemplary Aspect 10, in the optical display device according to any one of Inventive Exemplary Aspects 2 to 9, wherein said luminance adjusting element is a liquid crystal display device.

In this way, as the luminance adjusting element, a related art LCD panel with color filters removed of the color filters may be used or a related art LCD with color filters may have its color filters replaced by a monochrome filter for use, which can reduce the cost.

Inventive Exemplary Aspect 11

Meanwhile, in order to address or achieve the above described object, an optical display device according to Inventive Exemplary Aspect 11 has an optical modulator that has a plurality of pixels whose optical propagation characteristics can be controlled independently and a luminance adjusting light source that has a plurality of light sources whose luminance can be adjusted independently. The pixels in said optical modulator and the light sources in said luminance adjusting light source are arranged to optically correspond at m:n wherein m and n are integers and m<n or n>m, and said device modulates light from said luminance adjusting light source through said optical modulator and displays an image.

The device includes an average value calculating device to calculate the average value or weighted average value of color component values on a color-basis among the pixel values corresponding to said n pixels based on the display image data;

a luminance selecting device to select a luminance value corresponding to each of the pixels in said optical modulator among luminance component values in the pixel values corresponding to said n pixels based on said display image data;

an optical propagation characteristic determining device to determine the optical propagation characteristic of each of the pixels in said optical modulator based on the result of calculation by said average value calculating device and the result of selection by said luminance selecting device; and a control value determining device to determine a control value for each of the pixels in said optical modulator based on the optical propagation characteristics determined by said optical propagation characteristic determining device.

In this way, the average value calculating device can calculate the average value or weighted average value of color component values on a color-basis among the pixel values corresponding to said n pixels based on the display image data. The luminance selecting device can select a luminance value corresponding to each of the pixels in said optical modulator among luminance component values in the pixel values corresponding to said n pixels based on said display image data. The optical propagation characteristic determining device can determine the optical propagation characteristic of each of the pixels in said optical modulator based on the result of calculation by said average value calculating device and the result of selection by said luminance selecting device. The control value determining device can determine a control value for each of the pixels in said optical modulator based on the optical propagation characteristics determined by said optical propagation characteristic determining device.

Therefore, the optical propagation characteristic of each of the pixels in the optical modulator is determined using RGB values having only their color components averaged, and therefore mainly the color components of an image can be reproduced in the optical modulator with a lower resolution than the number of the light sources in the luminance adjusting light source. In addition, mainly the luminance component of the image is reproduced in the luminance adjusting light source with a resolution higher than the number of pixels in the optical modulator. Therefore, high picture quality image display in terms of visual perception can be carried out. This is because human visual perception has a lower resolution to colors than to luminance, and therefore mainly the luminance component is reproduced in the luminance adjusting light source with the high resolution, so that image display with a resolution equal to the luminance adjusting light source can be carried out.

Light from the light source is modulated in two stages through the luminance adjusting light source and the optical modulator, and therefore a relatively high luminance dynamic range and an increased number of gradation levels can be provided.

Herein, the luminance modulation light source includes an LED (Light Emitting Diode), an OLED (Organic Light Emitting Diode), and a light source such as a fluorescent lamp whose luminance can be adjusted. This also applies to an optical display device according to Inventive Exemplary Aspect 12, a program to control an optical display device according to Inventive Exemplary Aspects 20 and 21, and a method to control an optical display device according to Inventive Exemplary Aspects 32 and 33.

Inventive Exemplary Aspect 12

Meanwhile, in order to address and/or achieve the above described object, an optical display device according to Inventive Exemplary Aspect 12 has an optical modulator that has a plurality of pixels whose optical propagation characteristics can be controlled independently and a luminance adjusting light source that has a plurality of light sources whose luminance can be adjusted independently. The pixels in said optical modulator and the light sources in said luminance adjusting light source are arranged to optically correspond at m:n wherein m and n are integers and m<n or n>m, and said device modulates light from said luminance adjusting light source through said optical modulator and displays an image.

The device includes a first pixel value converting device to convert RGB values corresponding to n light sources in said luminance modulating light source corresponding to m pixels in said optical modulator into first pixel values in which the luminance component and color components of the RGB values are separated based on the display image data having pixel values including RGB values;

an average value calculating device to calculate the average value or weighted average value of said color component values on a color-basis among said first pixel values corresponding to said n pixels;

a luminance selecting device to select luminance values corresponding to the m pixels in said optical modulator among said luminance component values in said first pixel values corresponding to said n pixels;

a second pixel value converting device to convert second pixel values consisting of the result of calculation by said average value calculating device and the result of selection by said luminance selecting device into RGB values;

a luminance provisionally determining device to provisionally determine the luminance of each of the light sources in said luminance modulating light source;

an optical propagation characteristic determining device to determine the optical propagation characteristic of each of the pixels in said optical modulator based on the luminance provisionally determined by said luminance provisionally determining device and the RGB values converted by said second pixel value converting device;

a first control value determining device to determine a control value for each of the pixels in said optical modulator based on the optical propagation characteristic determined by said first optical propagation characteristic determining device;

a luminance determining device to determine the luminance of each of the light sources in said luminance modulating light source based on said display image data; and a second control value determining device to determine a control value for each of the pixels in said luminance modulating light source based on the luminance determined by said luminance determining device.

In this way, the first pixel value converting device can convert RGB values corresponding to n light sources in said luminance modulating light source corresponding to m pixels in said optical modulator into first pixel values in which the luminance component and color components of the RGB values are separated based on the display image data having pixel values including RGB values. The average value calculating device can calculate the average value or weighted average value of said color component values on a color-basis among said first pixel values corresponding to said n pixels. The luminance selecting device can select luminance values corresponding to the m pixels in said optical modulator among said luminance component values in said first pixel values corresponding to said n pixels. The second pixel value converting device can convert second pixel values consisting of the result of calculation by said average value calculating device and the result of selection by said luminance selecting device into RGB values.

The luminance provisionally determining device can provisionally determine the luminance of each of the light sources in said luminance modulating light source. The optical propagation characteristic determining device can determine a control value for each of the pixels in said optical modulator based on the optical propagation characteristic determined by said first optical propagation characteristic determining device. The luminance determining device can determine the luminance of each of the light sources in said luminance modulating light source based on said display image data. The second control value determining device can determine a control value for each of the pixels in said luminance modulating light source based on the luminance determined by said luminance determining device.

Therefore, the optical propagation characteristic of each of the pixels in the optical modulator is determined using RGB values having only their color components averaged, and therefore mainly the color components of an image can be reproduced in the optical modulator having a lower resolution than the number of light sources in luminance adjusting light source. In addition, mainly the luminance component of the image is reproduced in the luminance adjusting light source with the higher resolution than the number of pixels in the optical modulator, so that high picture quality image display in terms of visual perception can be carried out. Human visual perception has a lower resolution to colors than to luminance, and therefore mainly the luminance component is reproduced in the luminance adjusting element with the high resolution, so that image display with a resolution equal to that of the luminance adjusting element can be carried out.

Inventive Exemplary Aspect 13

Meanwhile, in order to address and/or achieve the above described object, an optical modulation control program according to Inventive Exemplary Aspect 13 is a program to control an optical display device having an optical modulator that has a plurality of pixels whose optical propagation characteristics can be controlled independently and a luminance adjusting element that has a plurality of pixels whose optical propagation characteristics can be controlled independently. The pixels in said optical modulator and the pixels in said luminance adjusting element are arranged to optically correspond at m:n wherein m and n are integers and m<n or n>m, and said device modulates light from a light source through said optical modulator and said luminance adjusting element and displays an image.

The program enables a computer to carry out processing implemented as an average value calculating device to calculate the average value or weighted average value of color component values on a color-basis in pixel values corresponding to said n pixels based on said display image data;

a luminance selecting device to select a luminance value corresponding to each of the pixels in said optical modulator among luminance component values in the pixel values corresponding to said n pixels based on said display image data;

an optical propagation characteristic determining device to determine the optical propagation characteristic of each of the pixels in said optical modulator based on the result of calculation by said average value calculating device and the result of selection by said luminance selecting device; and a control value determining device to determine a control value for each of pixels in said optical modulator based on the optical propagation characteristics determined by said optical propagation characteristic determining device.

Herein, the program according to the exemplary aspect is applicable to the optical display device according to Inventive Exemplary Aspect 1, and the same advantage as that provided by the optical modulator according to Inventive Exemplary Aspect 1 is provided.

Inventive Exemplary Aspect 14

Meanwhile, in order to address or achieve the above described object, an optical modulation control program according to Inventive Exemplary Aspect 14 is a program to control an optical display device an optical modulator that has a plurality of pixels whose optical propagation characteristics can be controlled independently and a luminance adjusting element that has a plurality of pixels whose optical propagation characteristics can be controlled independently. The pixels in said optical modulator and the pixels in said luminance adjusting element are arranged to optically correspond at m:n wherein m and n are integers and m<n or n>m, said device modulating light from a light source through said optical modulator and said luminance adjusting element and displaying an image.

The program includes a first pixel value converting device to convert RGB values corresponding to n pixels in said luminance adjusting element corresponding to m pixels in said optical modulator into first pixel values in which the luminance component and color components of the RGB values are separated;

an average value calculating device to calculate the average value or weighted average value of said color component values on a color-basis among said first pixel values corresponding to said n pixels;

a luminance selecting device to select luminance values corresponding to the m pixels in said optical modulator from the said luminance component values among said first pixel values corresponding to said n pixels;

a second pixel value converting device to convert second pixel values consisting of a result of calculation by said average value calculating device and a result of selecting by said luminance selecting device into RGB values;

an optical propagation characteristic provisionally determining device to provisionally determine the optical propagation characteristic of each of the pixels in said luminance adjusting element;

a first optical propagation characteristic determining device to determine the optical propagation characteristic of each of the pixels in said optical modulator based on the optical propagation characteristic provisionally determined by said optical propagation characteristic provisionally determining device;

a first control value determining device to determine a control value for each of the pixels in said optical modulator based on the optical propagation characteristic determined by said first optical propagation characteristic determining device;

a second optical propagation characteristic determining device to determine the optical propagation characteristic of each of the pixels in said luminance adjusting element based on said display image data; and a second control value determining device to determine a control value for each of the pixels in said luminance adjusting element based on the optical propagation characteristic determined by said second optical propagation characteristic determining device.

Herein, the program according to the exemplary aspect is applicable to the optical display device according to Inventive Exemplary Aspect 2, and the same advantage as that provided by the optical modulator according to Inventive Exemplary Aspect 2 is provided.

Inventive Exemplary Aspect 15

According to Inventive Exemplary Aspect 15, in the program to control an optical display device according to Inventive Exemplary Aspect 14, said first pixel value converting device converts said RGB values into first pixel values including a Y value representing the luminance component of the pixel, a Cb value representing color difference for blue in the pixel, and a Cr value representing color difference for red in the pixel.

Herein, the program according to the exemplary aspect is applicable to the optical display device according to Inventive Exemplary Aspect 3, and the same advantage as that provided by the optical modulator according to Inventive Exemplary Aspect 3 can be provided.

Inventive Exemplary Aspect 16

According to Inventive Exemplary Aspect 16, in the program to control an optical display device according to Inventive Exemplary Aspect 14 or 15, said luminance selecting device selects one of the maximum, intermediate, and minimum values among the luminance component values in said first pixel values corresponding to said n pixels as a luminance value corresponding to each of the pixels in said optical modulator.

Herein, the program according to the exemplary aspect is applicable to the optical display device according to Inventive Exemplary Aspect 4, and the same advantage as that provided by the optical modulator according to Inventive Exemplary Aspect 4 can be provided.

Inventive Exemplary Aspect 17

According to Inventive Exemplary Aspect 17, the program to control an optical display device according to any one of Inventive Exemplary Aspects 14 to 16 enables a method of controlling the optical display device having an optical modulator that has a plurality of pixels whose optical propagation characteristics can be controlled independently and a luminance adjusting element that has a plurality of pixels whose optical propagation characteristics can be controlled independently, the pixels in said optical modulator and the pixels in said luminance adjusting element are arranged to optically correspond at m:n wherein m and n are integers and m<n or n>m, said device modulating light from a light source through said optical modulator and said luminance adjusting element and displaying an image.

The method includes calculating the average value or weighted average value of color component values on a color-basis in pixel values corresponding to said n pixels based on said display image data;

selecting a luminance value corresponding to each of the pixels in said optical modulator among luminance component values in the pixel values corresponding to said n pixels based on said display image data;

determining the optical propagation characteristic of each of the pixels in said optical modulator based on the result of calculating in said average value calculating and the result of selection by said luminance selecting; and determining a control value for each of pixels in said optical modulator based on the optical propagation characteristics determined in said optical propagation characteristic determining.

Herein, the program according to the exemplary aspect is applicable to the optical display device according to Inventive Exemplary Aspect 6, and the same advantage as that provided by the optical modulator according to Inventive Exemplary Aspect 5 may be provided.

Inventive Exemplary Aspect 19

According to Inventive Exemplary Aspect 19, in the program to control an optical display device according to any one of Inventive Exemplary Aspects 14 to 18, when the pixel values of the display image data corresponding to the n pixels in said luminance adjusting element are the same, said first optical propagation characteristic determining device determines the optical propagation characteristic of each of the pixels in said optical modulator based on the optical propagation characteristic provisionally determined by said optical propagation characteristic provisionally determining device and the pixel values in said display image data.

Herein, the program according to the exemplary aspect is applicable to the optical display device according to Inventive Exemplary Aspect 7, and the same advantage as that provided by the optical modulator according to Inventive Exemplary Aspect 7 can be provided.

Inventive Exemplary Aspect 20

Meanwhile, in order to address or achieve the above described object, an optical modulation control program according to Inventive Exemplary Aspect 20 is a program to control an optical display device having an optical modulator that has a plurality of pixels whose optical propagation characteristics can be controlled independently and a luminance adjusting light source that has a plurality of light sources whose luminance can be adjusted independently. The pixels in said optical modulator and the light sources in said luminance adjusting light source are arranged to optically correspond at m:n wherein m and n are integers and m<n or n>m, and said device modulates light from said luminance adjusting light source through said optical modulator and displays an image.

The program includes an average value calculating device to calculate the average value or weighted average value of color component values on a color-basis in pixel values corresponding to said n pixels based on said display image data;

a luminance selecting device to select a luminance value corresponding to each of the pixels in said optical modulator among luminance component values in the pixel values corresponding to said n pixels based on said display image data;

an optical propagation characteristic determining device to determine the optical propagation characteristic of each of the pixels in said optical modulator based on the result of calculation by said average value calculating device and the result of selection by said luminance selecting device; and a control value determining device to determine a control value for each of pixels in said optical modulator based on the optical propagation characteristics determined by said optical propagation characteristic determining device.

Herein, the program according to the exemplary aspect is applicable to the optical display device according to Inventive Exemplary Aspect 11, and the same advantage as that provided by the optical modulator according to Inventive Exemplary Aspect 11 can be provided.

Inventive Exemplary Aspect 21

An optical modulation control program according to Inventive Exemplary Aspect 21 enables a method of controlling an optical display device having an optical modulator that has a plurality of pixels whose optical propagation characteristics can be controlled independently and a luminance adjusting element that has a plurality of pixels whose optical propagation characteristics can be controlled independently. The pixels in said optical modulator and the pixels in said luminance adjusting element are arranged to optically correspond at m:n wherein m and n are integers and m<n or n>m, and said device modulating light from a light source through said optical modulator and said luminance adjusting element and displaying an image.

The method includes converting RGB values corresponding to n pixels in said luminance adjusting element corresponding to m pixels in said optical modulator into first pixel values in which the luminance component and color components of the RGB values are separated based on the display image data having pixel values including RGB values;

calculating the average value or weighted average value of said color component values on a color-basis among said first pixel values corresponding to said n pixels;

selecting luminance values corresponding to the m pixels in said optical modulator from the said luminance component values among said first pixel values corresponding to said n pixels;

converting second pixel values into RGB values, said second pixel values consisting of the result of calculating in said average value calculating and the result of selection in said luminance selecting;

provisionally determining the optical propagation characteristic of each of the pixels in said luminance adjusting element;

determining the optical propagation characteristic of each of the pixels in said optical modulator based on the optical propagation characteristic provisionally determined in said optical propagation characteristic provisionally determining and the result of converting in said second pixel value converting;

determining a control value for each of the pixels in said optical modulator based on the optical propagation characteristic determined in said first optical propagation characteristic determining;

determining the optical propagation characteristic of each of the pixels in said luminance adjusting element based on said display image data; and determining a control value for each of the pixels in said luminance adjusting element based on the optical propagation characteristic determined in said second optical propagation characteristic determining.

Herein, the program according to the exemplary aspect is applicable to the optical display device according to Inventive Exemplary Aspect 12, and the same advantage as that provided by the optical modulator according to Inventive Exemplary Aspect 12 can be provided.

Inventive Exemplary Aspect 22

Meanwhile, in order to address or achieve the above described object, an optical modulation control method according to Inventive Exemplary Aspect 22 is a method of controlling an optical display device that has a plurality of pixels whose optical propagation characteristics can be controlled independently and a luminance adjusting light source that has a plurality of light sources whose luminance can be adjusted independently. The pixels in said optical modulator and the light sources in said luminance adjusting light source are arranged to optically correspond at m:n wherein m and n are integers and m<n or n>m, and said device modulates light from said luminance adjusting light source through said optical modulator and displays an image.

The method includes calculating the average value or weighted average value of color component values on a color-basis in pixel values corresponding to said n pixels based on said display image data;

selecting a luminance value corresponding to each of the pixels in said optical modulator among luminance component values in the pixel values corresponding to said n pixels based on said display image data;

determining the optical propagation characteristic of each of the pixels in said optical modulator based on the result of calculating in said average value calculating and the result of selection in said luminance selecting; and determining a control value for each of pixels in said optical modulator based on the optical propagation characteristics determined in said optical propagation characteristic determining.

In this way, the same advantage provided by the optical display device according to Inventive Exemplary Aspect 1 can be provided.

Inventive Exemplary Aspect 23

Meanwhile, in order to address or achieve the above object, an optical modulation control method according to Inventive Exemplary Aspect 23 is a method of controlling an optical display device that has a plurality of pixels whose optical propagation characteristics can be controlled independently and a luminance adjusting element that has a plurality of pixels whose optical propagation characteristics can be adjusted independently. The pixels in said optical modulator and the pixels in said luminance adjusting element are arranged to optically correspond at m:n wherein m and n are integers and m<n or n>m, and said device modulates light from said luminance adjusting light source through said optical modulator and displaying an image.

The method includes converting RGB values corresponding to n light sources in said luminance modulating light source corresponding to m pixels in said optical modulator into first pixel values in which the luminance component and color components of the RGB values are separated based on display image data having pixel values including RGB values;

calculating the average value or weighted average value of said color component values on a color-basis among said first pixel values corresponding to said n pixels;

selecting luminance values corresponding to the m pixels in said optical modulator from the said luminance component values among said first pixel values corresponding to said n pixels;

converting second pixel values consisting of the result of calculating in said average value calculating and the result of selection in said luminance selecting into RGB values;

provisionally determining the luminance of each of the light sources in said luminance modulating light sources;

determining the optical propagation characteristic of each of the pixels in said optical modulator based on the luminance provisionally determined in said luminance provisionally determining;

determining a control value for each of the pixels in said optical modulator based on the optical propagation characteristic determined in said first optical propagation characteristic determining;

determining the optical propagation characteristic of each of the pixels in said luminance modulator based on said display image data; and determining a control value for each of the light sources in said luminance modulating light source based on the luminance determined by said luminance determining.

In this way, the advantage the same as that provided by the optical display device according to Inventive Exemplary Aspect 2 may be provided.

Inventive Exemplary Aspect 24

According to Inventive Exemplary Aspect 24, in the method of controlling an optical display device according to Inventive Exemplary Aspect 23, in said first pixel converting, said RGB values are converted into first pixel values including a Y value representing the luminance component of the pixel, a Cb value representing color difference for blue in the pixel, and a Cr value representing color difference for red in the pixel.

In this way, the advantage provided by the optical display device according to Inventive Exemplary Aspect 3 may be provided.

Inventive Exemplary Aspect 25

According to Inventive Exemplary Aspect 25, in the method of controlling an optical display device according to Inventive Exemplary Aspect 23 or 24, any one of the maximum, intermediate, and minimum values among the luminance component values in said first pixel values corresponding to said n pixels is selected as a luminance value corresponding to each of the pixels in said optical modulator.

In this way, the advantage the same as that provided by the optical display device according to Inventive Exemplary Aspect 4 may be provided.

Inventive Exemplary Aspect 26

According to Inventive Exemplary Aspect 26, in the method of controlling an optical display device according to any one of Inventive Exemplary Aspects 23 to 25, in the second optical propagation characteristic determining, the optical propagation characteristic of each of the pixels in said luminance adjusting element is determined based on said display image data and the optical propagation characteristic determined by said first optical propagation characteristic determining device.

In this way, the advantage the same as that provided by the optical display device according to Inventive Exemplary Aspect 5 may be provided.

Inventive Exemplary Aspect 27

According to Inventive Exemplary Aspect 27, the method of controlling an optical display device according to Inventive Exemplary Aspect 26 further includes producing third pixel values corresponding to the n pixels in said luminance adjusting element based on said luminance component values corresponding to said n pixels in said first pixel values and the result of calculation by said average value calculating device; and the third pixel value converting step of converting said third pixel values into RGB values.

In said second optical propagation characteristic determining, the optical propagation characteristic of each of the pixels in said luminance adjusting element is determined based on the result of conversion by said third pixel value converting device and the optical propagation characteristic determined by said first optical propagation characteristic determining device.

In this way, the advantage the same as that provided by the optical display device according to Inventive Exemplary Aspect 6 may be provided.

Inventive Exemplary Aspect 28

According to Inventive Exemplary Aspect 28, in the method of controlling an optical display device according to any of Inventive Exemplary Aspects 23 to 27, when the pixel values of the display image data corresponding to the n pixels in said luminance adjusting element are the same, in said first optical propagation characteristic determining, the optical propagation characteristic of each of the pixels in said optical modulator is determined based on the optical propagation characteristic provisionally determined by said optical propagation characteristic provisionally determining device and the pixel values in said display image data.

In this way, the advantage provided by the optical display device according to Inventive Exemplary Aspect 7 may be provided.

Inventive Exemplary Aspect 29

According to Inventive Exemplary Aspect 29, in the method of controlling an optical display device according to any one of Inventive Exemplary Aspects 23 to 28, said optical modulator and said luminance adjusting element both have said pixels arranged in a matrix, the number of pixels in said luminance adjusting element is a integral multiple of the number of pixels in said optical modulator both in the row and column directions, and m pixels in said optical modulator and n pixels in said luminance adjusting element are arranged to regularly and optically correspond.

In this way, the advantage the same as that provided by the optical display device according to Inventive Exemplary Aspect 8 may be provided.

Inventive Exemplary Aspect 30

According to Inventive Exemplary Aspect 30, in the method of controlling an optical display device according to Inventive Exemplary Aspect 29, said device includes a plurality of said optical modulators corresponding to light in said RGB colors, and m pixel in said optical modulator and n pixels in said luminance adjusting element are arranged to regularly and optically correspond.

In this way, the advantage the same as that provided by the optical display device according to Inventive Exemplary Aspect 9 may be provided.

Inventive Exemplary Aspect 31

According to Inventive Exemplary Aspect 31, in the method of controlling an optical display device according to any one of Inventive Exemplary Aspects 23 to 30, said luminance adjusting element is a liquid crystal display device.

In this way, the advantage provided by the optical display device according to Inventive Exemplary Aspect 10 may be provided.

Inventive Exemplary Aspect 32

Meanwhile, in order to address or achieve the above described object, an optical display device control method according to Inventive Exemplary Aspect 32 is a method of controlling an optical display device having an optical modulator that has a plurality of pixels whose optical propagation characteristics can be controlled independently and a luminance adjusting element that has a plurality of pixels whose optical propagation characteristics can be controlled independently. The pixels in said optical modulator and the pixels in said luminance adjusting element are arranged to optically correspond at m:n wherein m and n are integers and m<n or n>m, and said device modulates light from a light source through said optical modulator and said luminance adjusting element and displaying an image.

The method includes the steps of calculating the average value or weighted average value of color component values on a color-basis in pixel values corresponding to said n pixels based on said display image data;

selecting a luminance value corresponding to each of the pixels in said optical modulator among luminance component values in the pixel values corresponding to said n pixels based on said display image data;

determining the optical propagation characteristic of each of the pixels in said optical modulator based on the result of calculating in said average value calculating and the result of selection by said luminance selecting; and determining a control value for each of pixels in said optical modulator based on the optical propagation characteristics determined in said optical propagation characteristic determining.

In this way, the advantage the same as that provided by the optical display device according to Inventive Exemplary Aspect 11 can be provided.

Inventive Exemplary Aspect 33

Meanwhile, in order to address or achieve the above described object, an optical display device control method according to Inventive Exemplary Aspect 33 is a method of controlling an optical display device that has a plurality of pixels whose optical propagation characteristics can be controlled independently and a luminance adjusting light source that has a plurality of light sources whose luminance can be adjusted independently. The pixels in said optical modulator and the light sources in said luminance adjusting light source are arranged to optically correspond at m:n wherein m and n are integers and m<n or n>m, and said device modulates light from said luminance adjusting light source through said optical modulator and displays an image.

The method includes converting RGB values corresponding to n light sources in said luminance modulating light source corresponding to m pixels in said optical modulator into first pixel values in which the luminance component and color components of the RGB values are separated based on display image data having pixel values including RGB values;

calculating the average value or weighted average value of said color component values on a color-basis among said first pixel values corresponding to said n pixels;

selecting luminance values corresponding to the m pixels in said optical modulator from the said luminance component values among said first pixel values corresponding to said n pixels;

converting second pixel values consisting of the result of calculating in said average value calculating and the result of selection in said luminance selecting into RGB values;

provisionally determining the luminance of each of the light sources in said luminance modulating light sources;

determining the optical propagation characteristic of each of the pixels in said optical modulator based on the luminance provisionally determined in said luminance provisionally determining;

determining a control value for each of the pixels in said optical modulator based on the optical propagation characteristic determined in said first optical propagation characteristic determining;

determining the luminance of each of the light sources in said luminance adjusting light source based on said display image data; and determining a control value for each of the light sources in said luminance modulating light source based on the luminance determined by said luminance determining.

In this way, the advantage the same as that provided by the optical display device according to Inventive Exemplary Aspect 12 can be provided.

BRIEF DESCRIPTION OF THE DRAWINGS

FIG. 7 shows a control value registration table for a liquid crystal light valve 40R;

FIG. 8 shows a control value registration table for a luminance modulation light value (liquid crystal light valve 30);

DETAILED DESCRIPTION OF PREFERRED EMBODIMENTS

Now, an exemplary embodiment of the invention will be described in conjunction with the accompanying drawings. FIGS. 1 to 18 show an optical display device, a control program for the optical display device, and a method of controlling the optical display device according to the embodiment of the invention.

Figure 1:
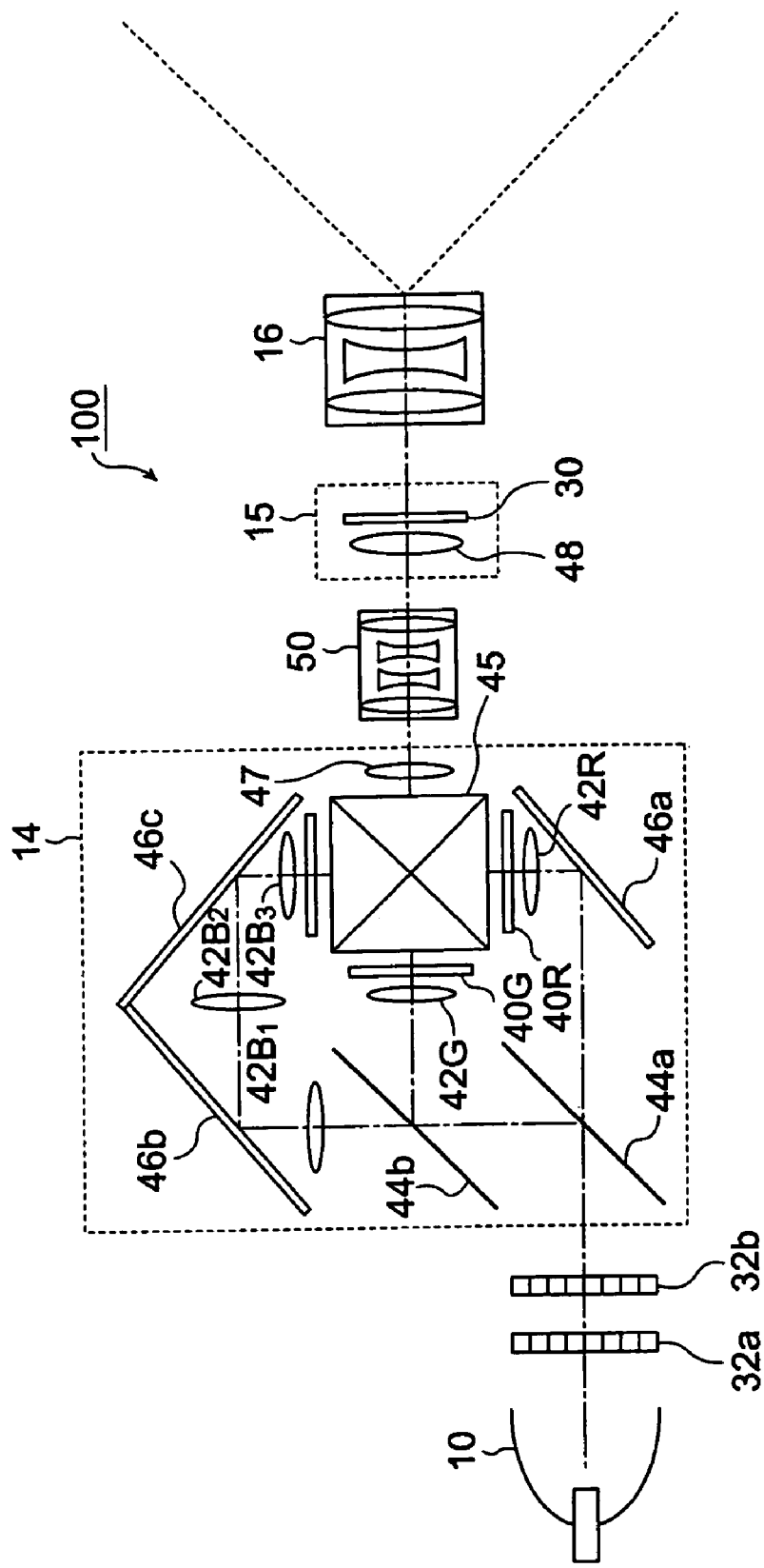
FIG. 1 is a schematic showing the main optical structure of a projection type display device 100 according to exemplary embodiments of the invention.

According to the above exemplary embodiments, as shown in FIG. 1, the optical display device, the control program for the optical display, and the method of controlling the optical display according to exemplary embodiments of the invention are applied to a projection type display device 100.

The structure of the projection type display device 100 will be described with reference to FIG. 1.

FIG. 1 is a schematic showing a main optical configuration of the projection type display device 100.

As shown in FIG. 1, the projection type display device 100 includes a light source 10 made of for example a ultra high pressure mercury lamp or a xenon lamp, two flyeye lenses 32a and 32b for diffusing unevenness in the luminance of light from the light source 10 and obtaining a homogeneous illuminance distribution on the illuminating surface, a color modulation portion 14 that modulates the luminance of three RGB primary colors in the wavelength region of the light coming in through the flyeye lenses 32a and 32b, an incoming side lens 47 to allow incoming light from the color modulation portion 14 to efficiently come into a relay lens 50, the relay lens 50 to precisely transmit the incoming light to a luminance modulation portion 15 through the incoming side lens 47 to a luminance modulation portion 15 (which will be described) with its intensity distribution being almost maintained and almost with no optical loss, the luminance modulation portion that modulates the luminance of the light coming through the relay lens 50 in the entire wavelength region, and a projecting portion 16 that projects the light coming in from the luminance modulation portion 15 on a screen (not shown).

The color modulation portion 14 includes three liquid crystal light valves 40R, 40G, and 40B (hereinafter referred to as "liquid crystal light valves 40R to 40B") having an arrangement of pixels in a matrix whose transmittance can be controlled independently, five field lenses 42R, 42G, and 42B1 to 42B3, two dichroic mirrors 44a and 44b, three mirrors 46a, 46b, and 46c, and a dichroic prism 45.

The luminance modulation portion 15 includes an output side lens 48 and a liquid crystal light valve 30. The output side lens 48 collimates light coming in through the relay lens 50 into almost parallel light for emission to the liquid crystal light valve 30. The liquid crystal light valve 30 has a matrix arrangement of a plurality of pixels that can be controlled independently and a resolution higher than the liquid crystal light valves 40R, 40G, and 40B.

Light coming into the color modulation portion 14 through the two flyeye lenses 32a and 32b is divided into light in red, green, and blue, i.e., into the three RGB primary colors by the dichroic mirrors 44a and 44b and also let into the liquid crystal light valves 40R to 40B through the field lenses 42R, 42G, and 42B1 to 42B3, and the mirrors 46a to 46c. The luminance of the light separated into the RGB three primary colors is modulated by the liquid crystal light valves 40R to 40B, and the modulated light in the RGB three primary colors is condensed by the dichroic prism 45 and let into the liquid crystal light valve 30 through the incoming side lens 47, the relay lens 50, and the output side lens 48. The luminance of the incoming light in the entire wavelength region is modulated by the liquid crystal light valve 30 and the resulting light is entered into the projecting portion 16.

In this example, the liquid crystal light valves 30, and 40R to 40B are each an active matrix type liquid crystal display device including a glass substrate having a matrix arrangement of pixel electrodes and switching elements such as thin film transistor devices and thin film diode to drive the electrodes, TN type liquid crystal held between the glass substrate and another glass substrate having a common electrode on the entire surface, and polarizers on the outer surfaces. The transmittance is changed depending on the control value (application voltage), and the intensity of light passing through the liquid crystal light valves can be modulated. If a white/bright (transmitting) state is attained in a voltage applied state, a black/dark (non-transmitting) state is attained in a non-voltage applied state, and the gradation between the states is controlled analog-wise depending on the applied control value. The liquid crystal light valves 30, and 40R to 40B each modulate the intensity of transmitted light and each contain an optical image depending on the modulation degree. The liquid crystal light valve 30 modulates light in the entire wavelength region (white light), while the liquid crystal light valves 40R to 40B modulate light in particular separated wavelength regions (color light such as R, Q and B). Hereinafter, the light intensity modulation carried out by the liquid crystal light valves 40R to 40B will be referred to as color modulation, while the light intensity modulation carried out by the liquid crystal light valve 30 will be referred to as luminance modulation for the ease of description. Similarly, the liquid crystal light valves 40R to 40B will be referred to as color modulation light valves and the liquid crystal light valve 30 will be referred to as a luminance modulation light valve.

The projection type display device 100 has a display control device 200 (not shown) that controls the luminance modulation light valve and the color modulation light valves. According to the exemplary embodiment, the luminance modulation light valve has a resolution higher than that of the color modulation light valves and therefore the display resolution (the resolution of an image displayed by the projection type display device 100 perceived by the viewer) is determined based on the luminance modulation light valve. It is understood that the display resolution may be determined based on the color modulation light valves instead. According to the exemplary embodiment, the luminance modulation light valve and the color modulation light valves are all a liquid crystal light valve in the normally black mode according to which a white/bright (transmitting) state is attained in a voltage applied state and a black/dark (non-transmitting) state is attained in a non-voltage applied state. The optical image in the light modulated in the liquid crystal light valves 40R to 40B and condensed by the dichroic prism 45 is transmitted to the liquid crystal light valve 30 through the relay optical system including the incoming side lens 47, the relay lens 50 and the output side lens 48 as it is reversed (as an inverted image).

Now, the configuration of the display control device 200 will be described with reference to FIG. 2.

Figure 2:
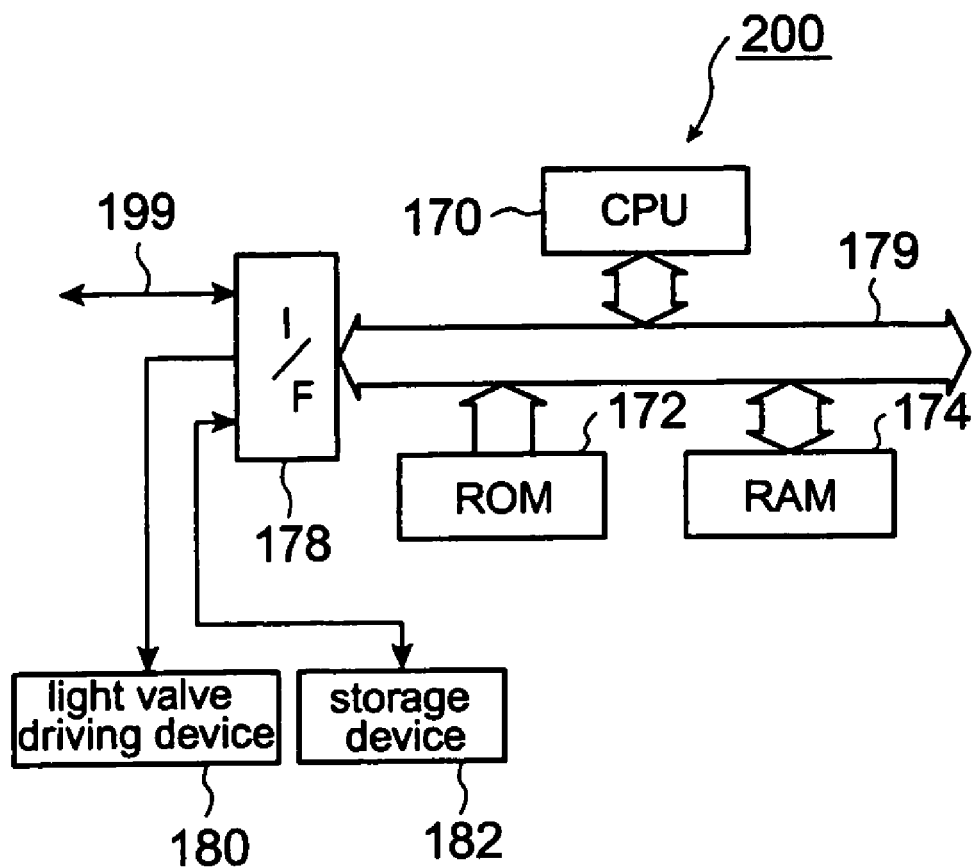
FIG. 2 is a schematic showing of the main optical structure of a display control device 200.

FIG. 2 is a schematic showing the hardware configuration of the display control device 200.

As shown in FIG. 2, the display control device 200 includes a CPU 170 that controls arithmetic operation and the entire system according to a control program, a ROM 172 that stores the control program for the CPU 170 and other programs in a prescribed region, a RAM 174 that stores data read out from the ROM 172 or results of operation necessary in the process of operation by the CPU 170, and an I/F 178 that interfaces with external devices for data input/output. These elements are connected with each other through a bus 179, a signal line for transferring data, so that they can exchange data with each other.

The I/F 178 is connected with external devices including a light valve driving device 180 that drives a luminance modulation light valve (liquid crystal light valve 30) and color modulation light valves (liquid crystal light valves 40R to 40B), a storage device 182 that stores data and tables as files, and a signal line for connecting with an external network 199.

The storage device 182 stores HDR display data to drive the luminance modulation light valve and the color modulation light valves.

The HDR display data can provide a high luminance dynamic range that cannot be provided by a related art image format such as sRGB, and stores pixel values representing the luminance levels of all the pixels of the image. According to the exemplary embodiment, as the HDR display data, a pixel value indicating a radiation luminance level for each of the three RGB primary colors on a pixel-basis is stored in the form of a floating point value. For example, as the pixel values of a pixel, values indicated as (R, G, B)=(1.2, 5.4, 2. 3) are stored.

For details of how to produce the HDR display data, see for example, related art Document, P. E. Debevec, J. Malik, "Recovering High Dynamic Range Radiance Maps from Photographs," Proceedings of ACM SIGGRAPH97, pp. 367-378 (1997).

The storage device 182 stores a control value registration table that registers control values for the color modulation light valves and the luminance modulation light valve.

Now, the configuration of the CPU 170 and the processing carried out by the CPU 170 will be described.

Figure 3:
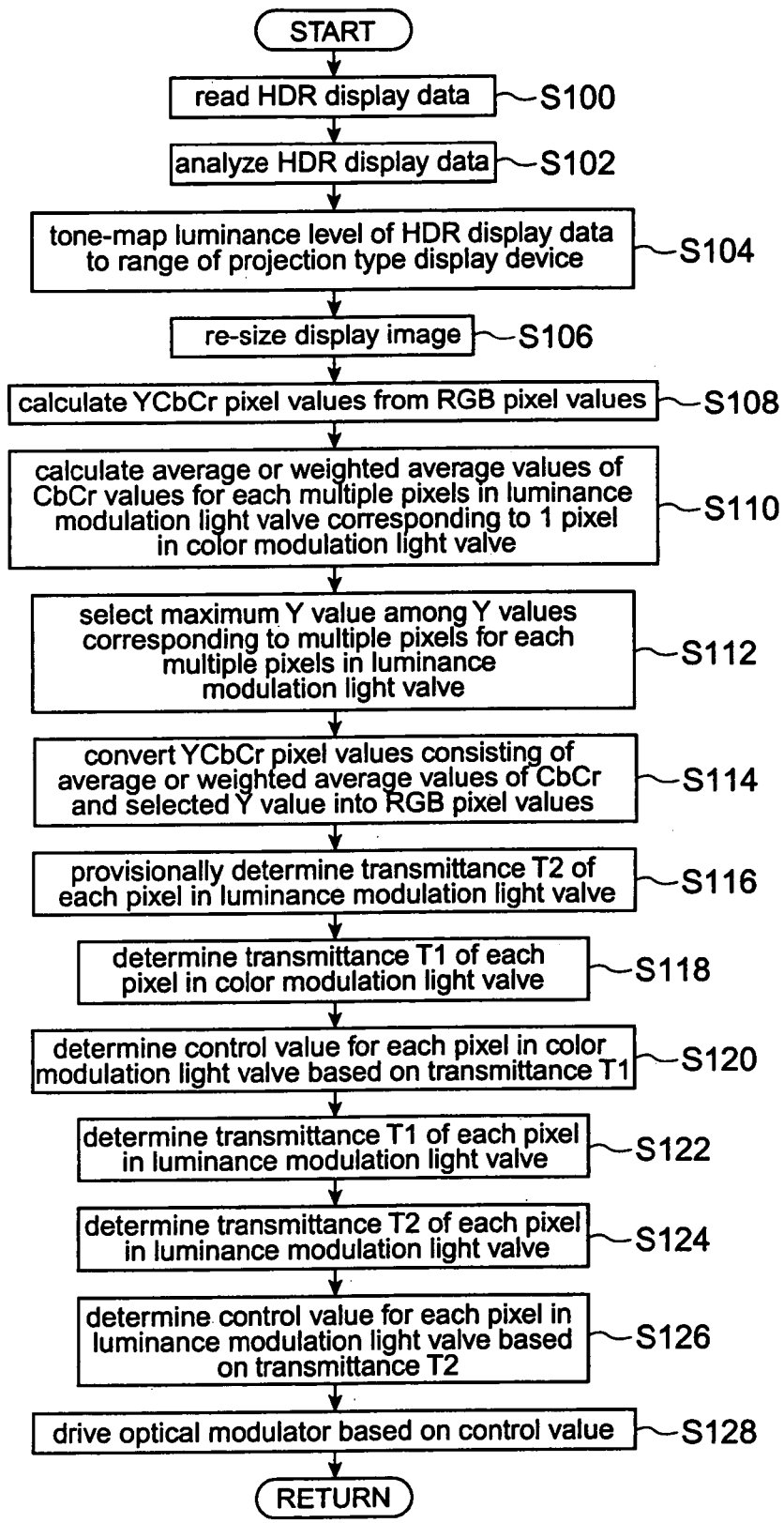
FIG. 3 is a flowchart for use in illustration of display control processing.

The CPU 170 includes a micro-processing unit (MPU), activates a prescribed program stored in a prescribed region of the ROM 172, and carries out display control processing shown in the flowchart in FIG. 3 according to the program.

FIG. 3 is a flowchart for use in illustration of the display control processing.

In the display control processing, the control values for the luminance modulation light valve and the color modulation light valves are determined based on the HDR display data and the luminance modulation light valve and color modulation light valves are driven based on the determined control values. When the processing is carried out in the CPU 170, the process proceeds to step S100 as shown in FIG. 3.

In step S100, the HDR display data is read out from the storage device 182 and the process proceeds to step S102.

In step S102, the read out HDR display data is analyzed and the histogram of the pixel values, the maximum, minimum and average values for the luminance level are calculated and the process proceeds to step S104. Here, the result of analysis is used for automatic image correction such as brightening up a dark scene, darkening too bright a scene, and emphasizing the middle part contrast or for tone mapping.

In step S104, based on the result of analysis in step S102, the luminance level of the HDR display data is tone-mapped to the luminance dynamic range of the projection type display device 100, and the process proceeds to step S106.

Figure 4A:
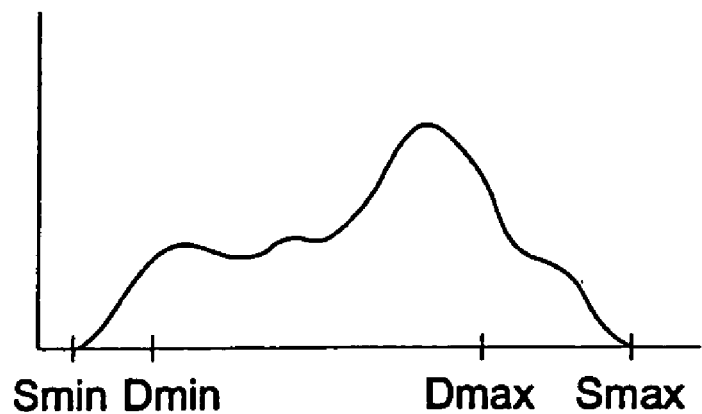
FIGS. 4(a) and 4(b) are schematic charts for use in illustration of tone-mapping processing.
Figure 4B:
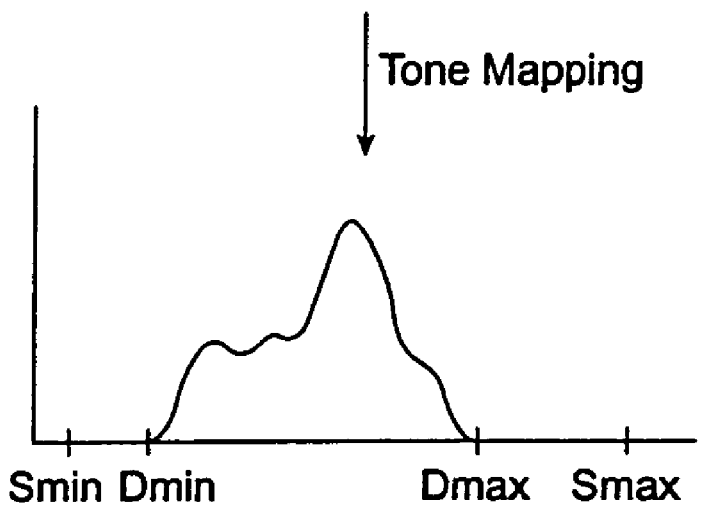
Figure 5:
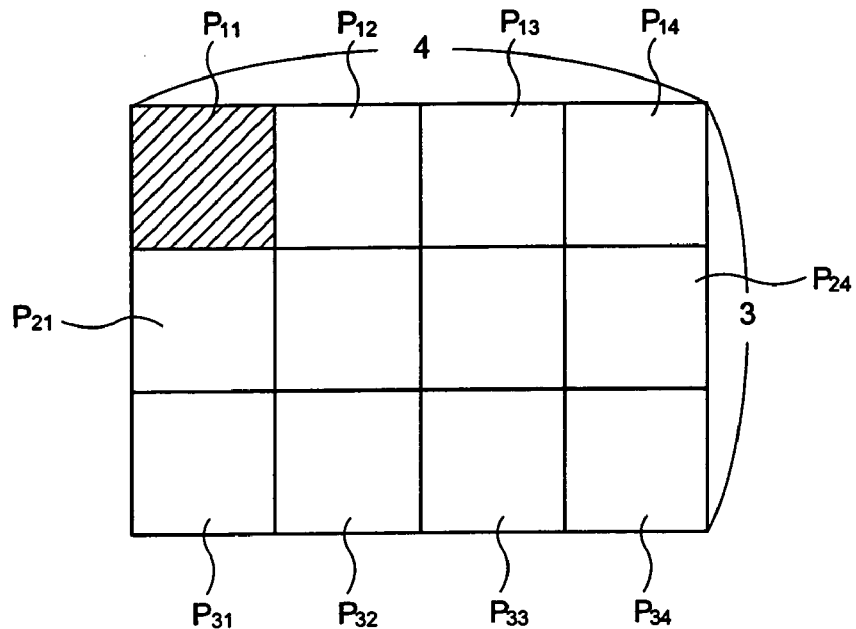
FIG. 5(a) is a schematic showing the structure of a pixel plane of a color modulation light valve.
FIG. 5(b) is a schematic showing the structure of a pixel plane of a luminance modulation light valve.
Figure 5:
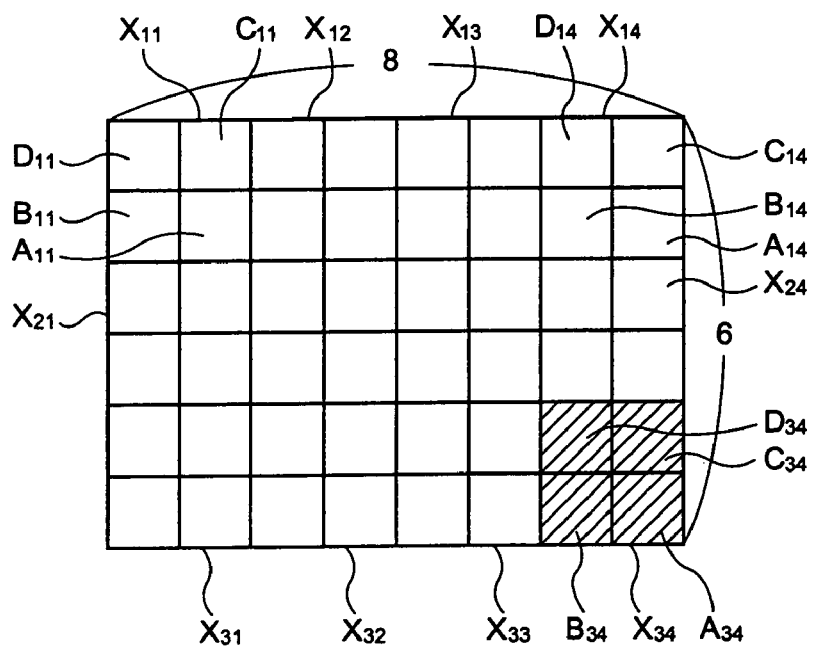

Here, FIG. 4 includes charts for use in illustration of the tone mapping processing.

Assume that as the result of analyzing the HDR display data, the luminance level included in the HDR display data is Smin at its minimum and Smax at its maximum. The luminance dynamic range of the projection type display 100 is Dmin at its minimum and Dmax at its maximum. In the example shown in FIG. 4, Smin is smaller than Dmin, Smax is larger than Dmax, and therefore the HDR display data cannot be displayed correctly. Therefore, normalization is carried out so that the histogram of Smin to Smax is within the range of Dmin to Dmax.

Note that for details of the tone mapping, see for example related art, F. Drago, K. Myszkowski, T. Annen, N. Chiba, "Adaptive Logarithmic Mapping For Displaying High Contrast Scenes," Eurographics 2003, (2003).

In step S106, the HDR image is re-sized (expanded or reduced) depending on the resolution of the luminance modulation light valve and then the process proceeds to step S108. Here, the HDR image is re-sized while the aspect ratio of the HDR image is maintained. The re-sizing method may be the average method, median method, or nearest neighbor method.

In step S108, the RGB pixel values for the re-sized image are converted into YCbCr pixel values according to the following expressions (3) to (5), and the process proceeds to step S110.

$$Y = 0.29891 \times R + 0.58661 \times G + 0.11448 \times B \quad (3)$$

$$Cb = -0.16874 \times R - 0.33126 \times G + 0.50000 \times B \quad (4)$$

$$Cr = 0.50000 \times R - 0.41869 \times G - 0.08131 \times B \quad (5)$$

Y represents the luminance value, Cb is the color difference for blue, and Cr is the color difference for red in the YCC color system, and R, G, and B are pixel values in the RGB color system and the RGB pixel values for the re-sized image.

In step S110, based on YCbCr pixel values for a plurality of pixels in the luminance modulation light valve corresponding to the pixels of color modulation light valves, the average or weighted average of Cb (hereinafter as "$Cb_{ave}$") and the average or weighted average of Cr (hereinafter as "$Cr_{ave}$") are calculated and the process proceeds to step S112.

In step S112, the largest Y value among Y values corresponding to the plurality of pixels for each of the plurality of pixels in the luminance modulation light valve (hereinafter as "$Y_{max}$") is selected and the process proceeds to step S114.

In step S114, the YCbCr pixel values resulting from $Cb_{ave}$ and $Cr_{ave}$ calculated in step S110 and $Y_{max}$ selected in step S112 are converted into RGB pixel values according to the following expressions (6) to (8), and the process proceeds to step S116.

$$R = Y_{max} + 1.371 \times Cr_{ave} \quad (6)$$

$$G = Y_{max} - 0.336 \times Cb_{ave} - 0.698 \times Cr_{ave} \quad (7)$$

$$B = Y_{max} + 1.732 \times Cb_{ave} \quad (8)$$

In step S116, an initial value (such as 0.2) is given as the transmittance T2 of each pixel in the luminance modulation light valve, and the transmittance T2 of the pixels is provisionally determined in this way. Then, the process proceeds to step S118.

In step S118, the RGB values obtained in step S114 are represented by Rp in the above expression (1), Tp is calculated for each of the pixels in the color modulation light valves from Rp and the luminance Rs of the light source 10, a transmittance T1 is calculated from the expression (2) on a pixel-basis in the color modulation light valves based on the resulting Tp, the transmittance T2 provisionally determined in step S116 and a gain G (for example 1.0), and the process proceeds to step S120. Since the color modulation light valves are made of the three liquid crystal light valves 40R to 40B, the transmittance T1 is calculated for each of the three RGB primary colors for each of the pixels.

In step S120, a control value corresponding to the transmittance T1 calculated for the pixel is read out from the control value registration table for each of the pixels in the color modulation light valves, and the read control value is determined as a control value for the pixel. Then, the process proceeds to S122.

In step S122, based on the transmittance T1 calculated in step S118, the transmittance T1 is determined on a pixel-basis in the luminance modulation light valve, and the process proceeds to step S124.

In step S124, a transmittance T2 is calculated on a pixel-basis in the luminance modulation light valve based on Rp, the RGB values of a re-sized image, the luminance Rs of the light source 10, and the T1 determined in step S122, and then the process proceeds to step S126.

In step S126, a control value corresponding to the transmittance T2 calculated for each of the pixels in the luminance modulation light valve is read out from the control value registration table, the read out control value is determined as the control value for the pixel and the process proceeds to step S128.

In step S128, the control values determined in steps S120 and S126 are output to the light valve control device 180, and the color modulation light valves and the luminance modulation light valve are both driven to project a display image. The series of processing ends, and the process returns to the original processing.

Now, the operation according to the exemplary embodiment will be described with reference to FIGS. 5(a) and 5(b) to 8.

Here, FIG. 5(a) is a schematic showing the structure of the pixel plane of the color modulation light valve, and FIG. 5(b) is a schematic showing the structure of the pixel plane of the luminance modulation light valve.

With reference to FIGS. 5(a) and 5(b), the relation between pixels in the color modulation light valves and the luminance modulation light valve will be described.

According to the exemplary embodiment, as shown in FIG. 5(a), the pixel plane of the color modulation light valves (liquid crystal light valves 40R to 40B) include pixels in a matrix of three columns and four rows. As shown in FIG. 5(b), the pixel plane of the luminance modulation light valve (liquid crystal light valve 30) includes pixels in a matrix of six columns and eight rows. More specifically, the number of pixels in the matrix of rows and columns in the luminance modulation light valve is exactly twice that in the color modulation light valve.

In this example, one pixel in the color modulation light valve and four pixels in the luminance modulation light valve are arranged to optically correspond. More specifically, a pixel $P_{11}$ in the color modulation light valve in FIG. 5(a) and a pixel block $X_{34}$ consisting of pixels $A_{34}$ to $D_{34}$ in the luminance modulation light valve in FIG. 5(b) are arranged to optically correspond. Similarly, pixels $P_{12}$ to $P_{14}$ and a pixel block $X_{33}$ ($A_{33}$ to $D_{33}$) and $X_{31}$ ($A_{31}$ to $D_{31}$) are arranged to optically correspond, pixels $P_{21}$ to $P_{24}$ and pixel block $X_{24}$ ($A_{24}$ to $D_{24}$) to $X_{21}$ ($A_{21}$ to $C_{21}$) are arranged to optically correspond, and pixels $P_{31}$ to $P_{34}$ and pixel blocks $X_{14}$ ($A_{14}$ to $D_{14}$) to $X_{11}$ ($A_{11}$ to $C_{11}$) are arranged to optically accurately correspond.

As denoted by the shadowed part in FIGS. 5(a) and 5(b), the pixel $P_{11}$ (upper left) in the color modulation light valve and the pixel block $X_{34}$ (lower right) in the luminance modulation light valve correspond because an optical image formed on the display plane of the luminance modulation light valve is inverted by the relay optical system including the incoming side lens 47, the relay lens 50, and the output side lens 48.

In the display control device 200, HDR display data is read out through steps S100 to S104, and the read HDR display data is analyzed. Based on the result of analysis, the luminance level of the HDR display data is tone-mapped to the luminance dynamic range of the projection type display device 100. Then, after step S106, the HDR image is re-sized according to the resolution of the color modulation light valves.

Then, after step S108, the RGB pixel values on a pixel-basis in the re-sized image are converted into YCbCr pixel values. Now, with reference to FIG. 6, the process of converting RGB pixel values into YCbCr pixel values will specifically be described.

Figure 6:
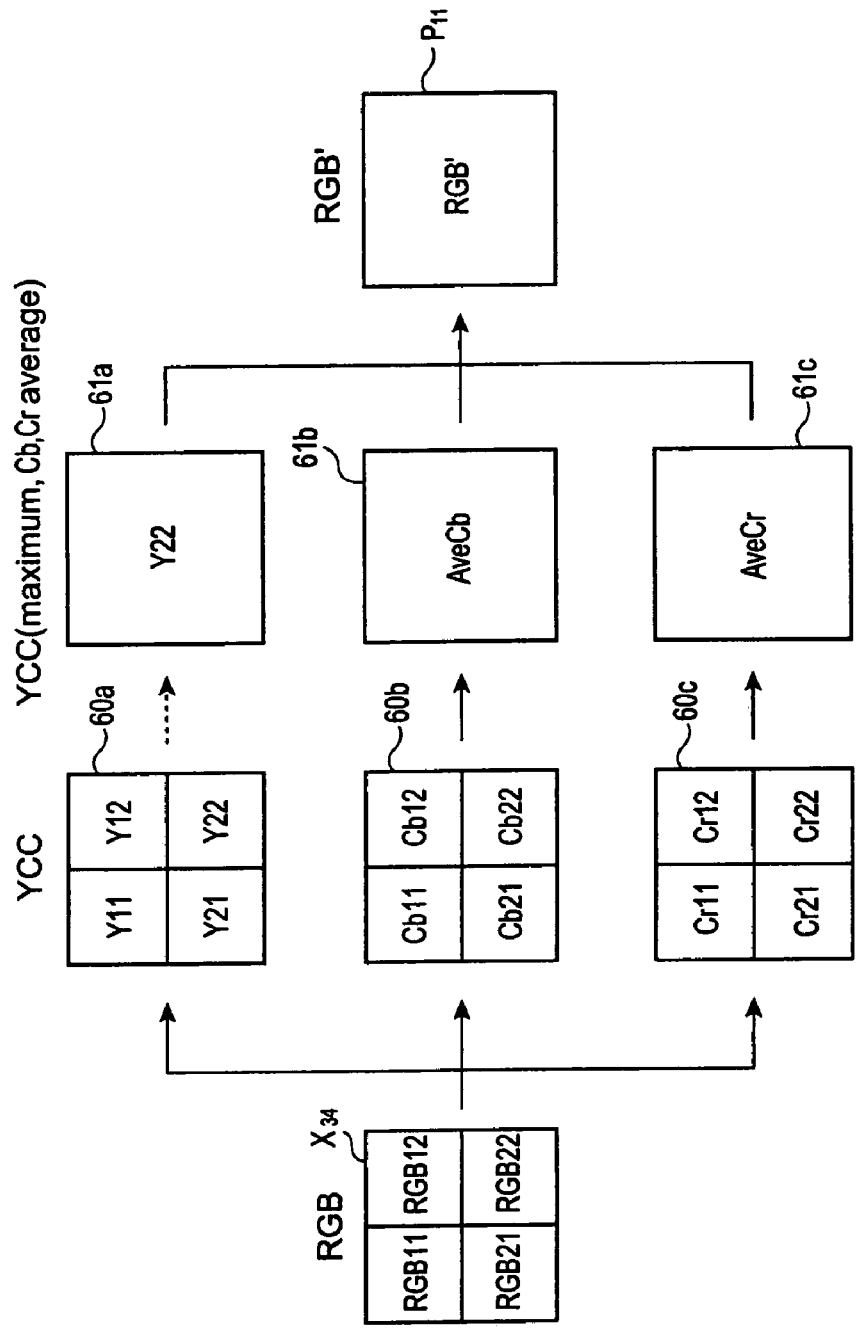
FIG. 6 is a schematic showing the concept of how pixel value converting processing is carried out to RGB pixel values corresponding to a pixel block $X_{34}$.

Here, FIG. 6 shows the concept of how the pixel value converting processing to RGB pixel values for the pixel block $X_{34}$ is carried out. As shown in FIG. 6, the pixel block $X_{34}$ in the luminance modulation light valve, RGB11 corresponds to the pixel $D_{34}$ as the RGB pixel values, RGB12 to the pixel $C_{34}$, RGB21 to the pixel $B_{34}$, and RGB22 to the pixel $A_{34}$. In this example, the RGB pixel values are as follows.

RGB11: (R11, G11, B11)=(1.0, 1.0, 25.5)
RGB12: (R12, G12, B12)=(5.1, 10.2, 25.5)
RGB21: (R21, G21, B21)=(1.0, 20.4, 25.5)
RGB22: (R22, G22, B22)=(15.3, 20.4, 25.5)

As denoted by 60a to 60c in FIG. 6, the processing of converting the pixel values RGB11 to RGB22 described above into YCbCr values is carried out according to the expressions (3) to (5), and RGB 11 is converted to YCbCr11: (Y11, Cb11, Cr11)=(3.8, 12.3, −2.0), RGB12 into YCbCr12: (Y12, Cb12, Cr12)=(10.4, 8.5, −3.8), RGB21 into YCbCr21: (Y21, Cb21, Cr21)=(15.2, 5.8, −10.1), and RGB22 into YCbCr (Y22, Cb22, Cr22)=(19.5, 3.4, −3.0).

Then, after step S110, for the YCbCr pixel values obtained by conversion in step S108, the average values of Cb and Cr are calculated for every four pixels in the luminance modulation light valve corresponding to one pixel in the color modulation light valve. More specifically, the average value of Cb11 to Cb22 and the average value of Cr11 to Cr22 in the YCbCr11 to YCbCr22 are calculated. More specifically, the average value $Cb_{ave}$ of Cb11 to Cb22 is "7.5" and the average value $Cr_{ave}$ of Cr11 to Cr22 is "−4.7."

According to the exemplary embodiment, as shown in FIGS. 5(a) and 5(b), the average value is calculated in a simple manner because one pixel in the color modulation light valve and four pixels in the luminance modulation light valve exactly correspond to each other. Meanwhile, in several pixels of the plurality of pixels in the luminance modulation light valve corresponding to one pixel in the color modulation light valve, when only a part of each pixel corresponds to one pixel in the color modulation light valve (i.e., when there is no exact corresponding relation), a weighted average is calculated using the area ratio or the like. Details of how to obtain a weighted average will be described later.

Now, after step S112, for the YCbCr pixel values resulting by the conversion in step S108, the maximum luminance value Y is selected from corresponding YCbCr pixel values for every four pixels in the luminance modulation light valve corresponding to one pixel in the color modulation light valve. More specifically, among Y11 to Y22 in YCbCr11 to YCbCr22, the maximum luminance value Y is selected. Here, the largest value, Y22 (19.5) in YCbCr22 is selected. In the processing of selecting the Y value, the Y value at its maximum is selected, while other standards may be employed and the Y value at its minimum or the intermediate luminance value may be selected.

Then, after step S114, YCbCr pixel values consisting of $Cb_{ave}$ and $Cr_{ave}$ obtained in step S110 and the largest luminance value Y selected in step S112 are converted into RGB pixel values. More specifically, when the YCbCr pixel values consisting of $Cb_{ave}$, $Cr_{ave}$, and Y22 are YCbCr', YCbCr': (Y22, $Cb_{ave}$, $Cr_{ave}$)=(19.5, 7.5, −4.7) are converted into RGB pixel values according to the above expressions (6) to (8). Consequently, the resulting RGB pixel values (referred to as "RGB'") are RGB': (R', G', B')=(13.0, 20.2, 32.6).

Then, after step S116, the transmittance T2 of each of the pixels in the luminance modulation light valve is provisionally determined. For example, "0.2" is provisionally determined as the transmittance T2.

Then, after step S118, the transmittance T1 of each of the pixels in the color modulation light valve is determined. More specifically, when the luminance level Rp of the pixel p in the expression (1) is (R', G', B')=(13.0, 20.2, 32.6) obtained in step S114, and the luminance Rs (R, G, B) of the light source 10 is (10000, 10000, 10000), the optical modulation ratio Tp of the pixel p in the re-sized image is (13.0, 20.2, 32.6)/(10000, 10000, 10000)=(0.00130, 0.00202, 0.00326). Based on Tp (0.00130, 0.00202, 0.00326), the transmittance T2 provisionally determined in step S116 (0.2 in this example), and the gain G=1, according to the expression (2), the transmittance T1 (T1(R) to T1(B)) of each of the pixels corresponding to the pixel p in the color modulation light valves (liquid crystal light valves 40R to 40B) can be obtained from the following expressions (9) to (11):

$$T1(R)=Tp(R)/T2 \quad (9)$$

$$T1(G)=Tp(G)/T2 \quad (10)$$

$$T1(B)=Tp(B)/T2 \quad (11)$$

More specifically, from the above expressions (9) to (11), T1(R)=0.00650, T1(G)=0.0101, and T1(B)=0.0163 result.

Then, after step S120, the control value of each of the pixels in the color modulation light valve is determined based on the transmittance T1 determined in step S118. According to the exemplary embodiment, the control value is selected from the control value registration table stored in the storage device 182. In the process of selecting the control value, the transmittance the closest to the calculated transmittance T1 is obtained by searching through the control value registration table, and the control value corresponding to the transmittance found by the search is read out. This search can be achieved at higher speed for example by binary search. FIG. 7 shows an example of the control registration table corresponding to the liquid crystal light valve 40R. More specifically, from the control value registration table 700R, 0.007, the closest value to the transmittance T1(R)=0.0065 has been found. The control value 1 corresponding to this is read out as the control value for the pixel P11 in the liquid crystal light valve 40R. Note that for the ease of description, only the liquid crystal light valve 40R is described, while the display control device 200 has identical control value registration tables for the liquid crystal light valves 40G and 40B. Therefore, similarly to the above example, control values for transmittances T1(G)=0.0101 and T1(B)=0.0163 are read out the corresponding control value registration tables. In the following processing, the closest transmittance values corresponding to the control values read out from the control value registration tables are used as T1(R), T1(G), and T1(B). More specifically, as T1(R)=0.007, T1(G)=0.010, and T1(B) =0.018, the following process of determining the transmittance T2 in the luminance modulation light valve is carried out. For the transmittances T1(G) and T1(B), the values in the control value registration table 700 are used for the ease of description, while in practice the closest transmittances are selected in the dedicated control value registration tables.

Then, after step S122, the transmittance T1 of each of the pixels in the luminance modulation light valve is determined from the transmittance T1 determined in step S118. According to the exemplary embodiment, as shown in FIGS. 5(a) and 5(b), one pixel in the color modulation light valve and four pixels in the luminance modulation light valve exactly correspond and therefore the average of T1(R) to T1(B) determined in step S118 is set as the value T1 of the four pixels in the luminance modulation light valve. Meanwhile, in several pixels of the plurality of pixels in the luminance modulation light valve corresponding to one pixel in the color modulation light valve, when only a part of each pixel corresponds to one pixel in the color modulation light valve (i.e., when there is no exact corresponding relation), a weighted average is calculated using the area ratio or the like. Details of how to obtain a weighted average will be described later.

More specifically, as for the transmittances T1 (referred to as T1($A_{34}$) to T1($D_{34}$)) of the pixels $A_{34}$ to $D_{34}$, the transmittances T1($A_{34}$)(R, G, B) to T1($D_{34}$)(R, G, B) are each (0.007, 0.010, and 0.018).

Then, after step S124, the transmittance T2 of each of the pixels in the luminance modulation light valve is determined. More specifically, the pixel block $X_{34}$ in the luminance modulation light valve will be described. The value Rp in the expression (1) for the pixels $D_{34}$ to $A_{34}$ is set as RGB pixel values (R11, G11, B11)=(1.0, 1.0, 25.5), (R12, G12, B12)=(5.1, 10.2, 25.5), (R21, G21, B21)=(1.0, 20.4, 25.5), and (R22, G22, B22)=(15.3, 20.4, 25.5). Using these RGB values and the luminance of the light source 10, Rs(R, G, B)=(10000, 10000, 10000), Tp is calculated for pixels $D_{34}$ to $A_{34}$ as follows. In this way, Tp($D_{34}$)=(0.00010, 0.00010, 0.00255), Tp($C_{34}$)=(0.000510, 0.00102, 0.00255), Tp($B_{34}$)=(0.00010, 0.00204, 0.00255), and Tp($A_{34}$)=(0.00153, 0.00204, 0.00255) result.

Based on Tp($A_{34}$) to Tp($D_{34}$) and the transmittances T1($A_{34}$)(R, G, B) to T1($D_{34}$)(R, G, B)=(0.007, 0.010, 0.018) determined in step S122 and the gain G=1, the transmittances T2 ((T2($A_{34}$) to T2($D_{34}$)) of pixels $A_{34}$ to $D_{34}$ are calculated according to the expression (2). Note that according to this exemplary embodiment, only one luminance modulation light valve is provided, and therefore the transmittances T2A (R) to T2A(B) for the pixel $A_{34}$, T2B(R) to T2B(B) for the pixel $B_{34}$, T2C(R) to T2C(B) for the pixel $C_{34}$ and T2D(R) to T2D(B) for the pixel $D_{34}$ are obtained according to the expression (2) based on Tp($A_{34}$) to Tp($D_{34}$) and T1($A_{34}$)(R, G, B) to T1 ($D_{34}$)(R, G, B). The average of the transmittances T2A(R) to T2A(B) is obtained as the transmittance T2($A_{34}$) of the pixel $A_{34}$, the average of the transmittances T2B(R) to T2B(B) as the transmittance T2($B_{34}$) of the pixel $B_{34}$, the average of the transmittances T2C(R) to T2C(B) as the transmittance T2($C_{34}$) of the pixel $C_{34}$, and the average of T2D(R) to T2D(B) as the transmittance T2($D_{34}$) of the pixel $D_{34}$. In this way, T2($A_{34}$)=0.188, T2($B_{34}$)=0.120, T2($C_{34}$)=0.106, and T2($D_{34}$)=0.055 result.

In the above description, T2($A_{34}$) to T2($D_{34}$) are obtained as the average values of the R, G, and B values, T2A(R) to T2A(B); T2B(R) to T2B(B); T2C(R) to T2C(B); and T2D(R) to T2D(B), respectively. Meanwhile, the maximum, intermediate, or minimum value of the R, G, B values may be used instead. The values with minimum errors are preferable.

Then, after step S126, the control value for each of the pixels in the luminance modulation light valve is determined from the transmittance T2 determined in step S124. According to the exemplary embodiment, the control values are selected from the control value registration table stored in the storage device 182. In the process of selecting a control value, the control value registration table is searched through for the transmittance the closest to the calculated transmittance T1, and the control value corresponding to the transmittance found by the search is read out. The search can be carried out at high speed by the binary search. In this example, FIG. 8 shows an example of the control value registration table for the luminance modulation light valve (liquid crystal light valve 30). From the control value registration table 800, the values (0.150, 0.150, 0.090, 0.060) that are the closest to the transmittances $T2(A_{34})$=0.188, $T2(B_{34})$=0.120, $T2(C_{34})$=0.106, and $T2(D_{34})$=0.055 are found and the control values (9, 9, 8, 7) corresponding to these values are read out as the control values for the pixels $A_{34}$ to $D_{34}$ in the pixel block $X_{34}$ in the liquid crystal light valve 30.

Then, after step S128, the determined control value is output to the light valve driving device 180. In this way, the color modulation light valves and the luminance modulation light valve are driven, so that a display image is projected.

Now, with reference to FIGS. 9 and 10, the method will be described for obtaining the Cb value of each of the pixels in the color modulation light valve and the transmittance T1 of each of the pixels in the luminance modulation light valve by calculating a weighted average when one pixel in the color modulation light valve and a plurality of pixels in the luminance modulation light valve do not exactly correspond.

Figure 9:
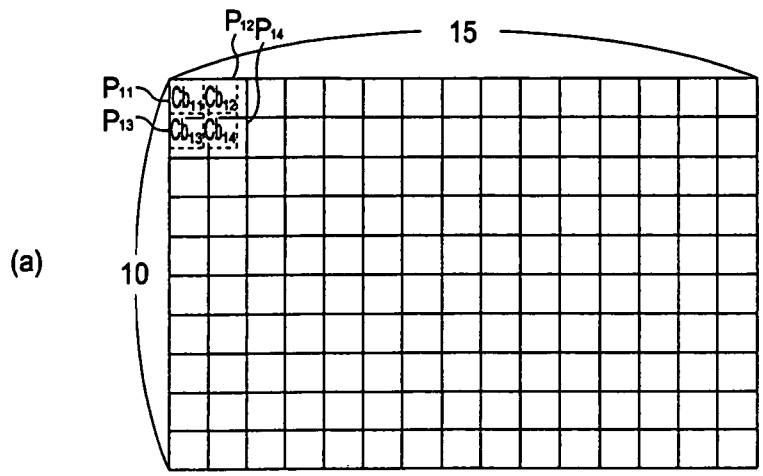
FIG. 9(a) is a schematic showing how pixels correspond between a color modulation light valve and a luminance modulation light valve.
FIG. 9(b) is a schematic showing an example of how to obtain the weighted average values of Cb in a pixel $P_{11}$ in a color modulation light valve.
FIG. 9(c) is a schematic showing a result of obtaining the weighted average values of Cb in pixels $P_{11}$ to $P_{14}$ in a color modulation light valve.
Figure 9:
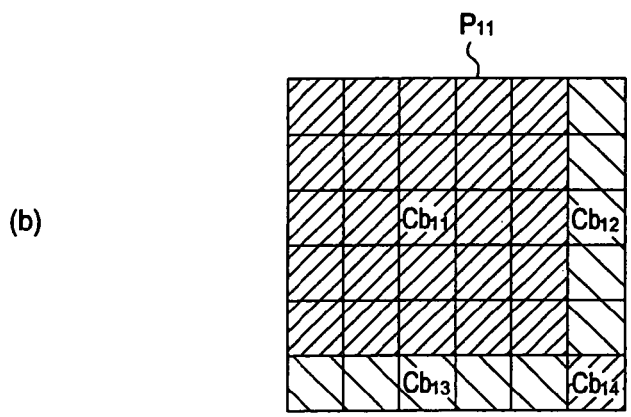
Figure 9:
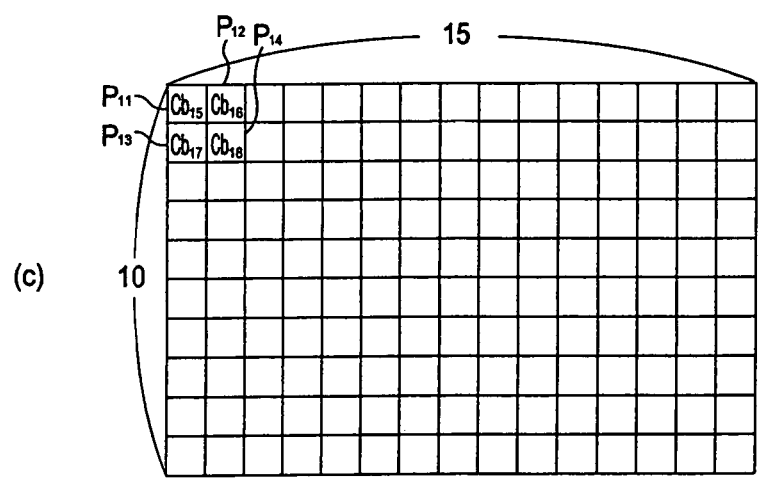

FIG. 9(*a*) shows how pixels correspond between the color modulation light valve and the luminance modulation light valve. FIG. 9(*b*) shows an example of how to obtain the weighted average of Cb in the pixel $P_{11}$ in the color modulation light valve. FIG. 9(*c*) shows the result of obtaining the weighted average of Cb in pixels $P_{11}$ to $P_{14}$ in the color modulation light valve.

When four pixels in the upper left four cells in the color modulation light valve are referred to as $P_{11}$ (upper left), $P_{12}$ (upper right), $P_{13}$ (lower left), and $P_{14}$ (lower right), the pixel $P_{11}$ has different resolutions between the color modulation light valve and the luminance modulation light valve, and therefore, as shown in FIG. 9(*a*), the pixel overlaps the four pixels in the luminance modulation light valve defined by the dotted line in the optical path. In this example, the resolution in the luminance modulation light valve is 18×12, while the resolution in the color modulation light valve is 15×10. Note that the Cb values in the YCbCr values corresponding to the four pixels in the luminance modulation light valve defined by the dotted line are $Cb_{11}$ to $Cb_{14}$ as shown in FIG. 9(*a*). The pixel $P_{11}$ can be separated into a rectangular matrix of 6×6 based on the least common denominator. The ratio of the overlapping area between the pixel $P_{11}$ and the four pixels denoted by the dotted line is 25:5:5:1 as shown in FIG. 9(*b*). Therefore, the Cb value of the pixel $P_{11}$, $Cb_{15}$ can be calculated from the following expression (12) as shown in FIG. 9(*c*).

$$Cb_{15}=(Cb_{11}\times 25+Cb_{12}\times 5+Cb_{13}\times 5+Cb_{14}\times 1)/36 \quad (12)$$

Similarly to the pixel $P_{11}$, the Cb values, $Cb_{16}$ to $Cb_{18}$ of the pixels $P_{12}$ to $P_{14}$ can be obtained by calculating the weighted average values based on the area ratio.

Figure 10:
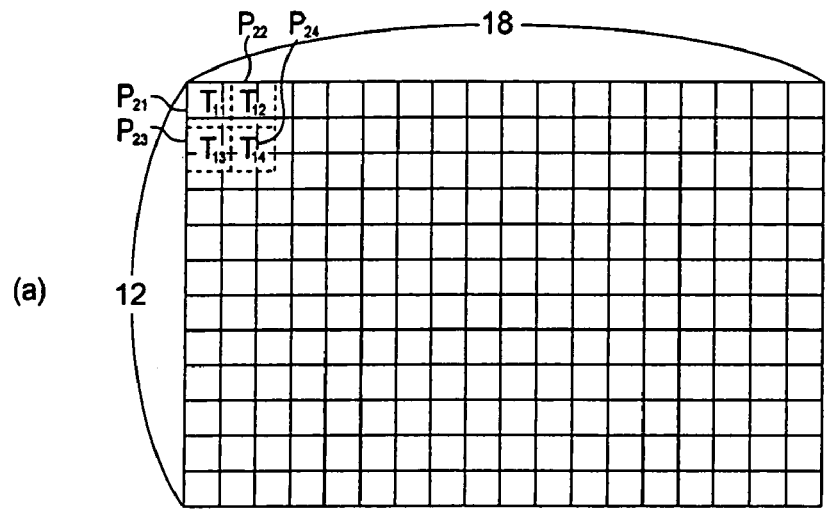
FIG. 10(a) is a schematic showing how pixels correspond between a color modulation light valve and a luminance modulation light valve.
FIG. 10(b) is a schematic showing an example of how to obtain the weighted average values of transmittances T1 in a pixel $P_{24}$ in a luminance modulation light valve.
FIG. 10(c) is a schematic showing a result of obtaining the weighted average values of transmittances T1 in pixels $P_{21}$ to $P_{24}$ in a luminance modulation light valve.
Figure 10:
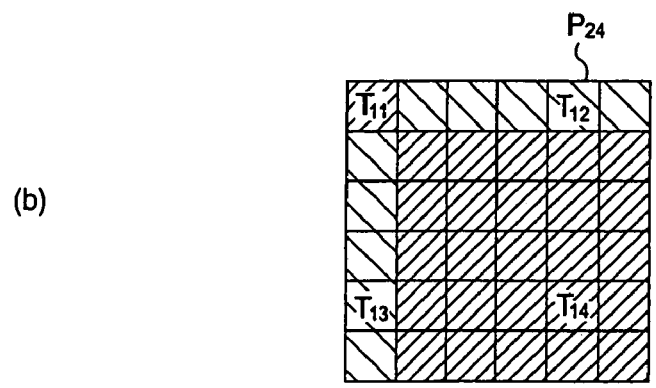
Figure 10:
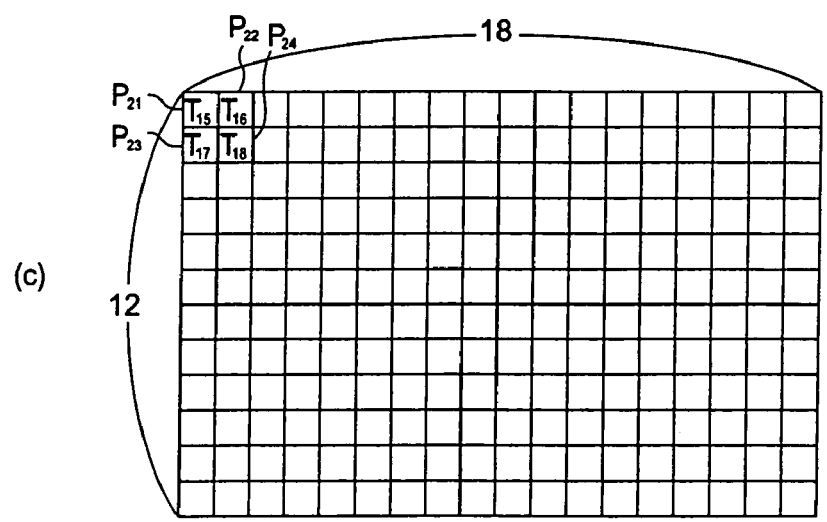

FIG. 10(*a*) shows how pixels correspond between the color modulation light valve and the luminance modulation light valve, FIG. 10(*b*) shows an example of how to obtain the weighted average of transmittances T1 in the pixel $P_{24}$ in the luminance modulation light valve, and FIG. 10(*c*) shows the result of obtaining the weighted average of the transmittances T1 of pixels $P_{21}$ to $P_{24}$ in the luminance modulation light valve.

When four pixels in the upper left four cells in the luminance modulation light valve are referred to as $P_{21}$ (upper left), $P_{22}$ (upper right), $P_{23}$ (lower left), and $P_{24}$ (lower right), the pixel $P_{24}$ has different resolutions between the color modulation light valve and the luminance modulation light valve, and, therefore, as shown in FIG. 10(*a*), the pixel overlaps the four pixels in the luminance modulation light valve defined by the dotted line in the optical path. In this example, the resolution of the luminance modulation light valve is 18×12 and the resolution of the color modulation light valve is 15×10. Note that the transmittances T1 corresponding to the four pixels defined by the dotted line in the color modulation light valve are $T_{11}$ to $T_{14}$ as shown in FIG. 10(*a*). The pixel $P_{24}$ can be separated into a rectangular matrix of 5×5 based on the least common denominator. The ratio of the overlapping area between the pixel $P_{24}$ and the four pixels denoted by the dotted line is 1:4:4:16 as shown in FIG. 10(*b*). Therefore, the transmittance T1 of the pixel $P_{24}$, $T_{18}$ can be calculated from the following expression (13) as shown in FIG. 10(*c*).

$$T_{18}=(T_{11}\times 1+T_{12}\times 4+T_{13}\times 4+T_{14}\times 16)/25 \quad (13)$$

Similarly to the pixel $P_{24}$, the transmittances $T_{15}$ to $T_{17}$ of the pixels $P_{21}$ to $P_{23}$ can be obtained by calculating the weighted averages based on the area ratio.

The following advantage is provided according to the projection type display device 100 as described above. The RGB pixel values in the HDR display data are converted into the YCbCr pixel values, and using YCbCr pixel values corresponding to four pixels in the luminance modulation light valve corresponding to one pixel in the color modulation light valve, Y value for the maximum luminance, $Y_{max}$ is selected, the average values $Cb_{ave}$ and $Cr_{ave}$ are obtained for the CbCr values, and therefore the YCbCr pixel values consisting of $Y_{max}$, $Cb_{ave}$, and $Cr_{ave}$ are converted into RGB pixel values. The RGB values having only their color components averaged are used to determine the transmittance T1 of each of the pixels in the color modulation light valve, and therefore mainly color components in an image can be reproduced in the color modulation light valves with a lower resolution than that of the luminance modulation light valve. In addition, in the luminance modulation light valve with a higher resolution than the color modulation light valves, mainly the luminance component of the image can be reproduced. In this way, high picture quality display in terms of human visual perception can be provided.

One pixel in the color modulation light valve and four pixels in the luminance modulation light valve are arranged to optically correspond in a precise manner, so that the processing can be carried out by obtaining simple average values without obtaining weighted averages, which can reduce the necessary processing load.

Note that according to the exemplary embodiment described above, the resolutions in the vertical and horizontal directions of the luminance modulation light valve are twice those of the color modulation light valve, but they may be three times or more instead of twice, and still the same processing can be carried out.

Figure 11:
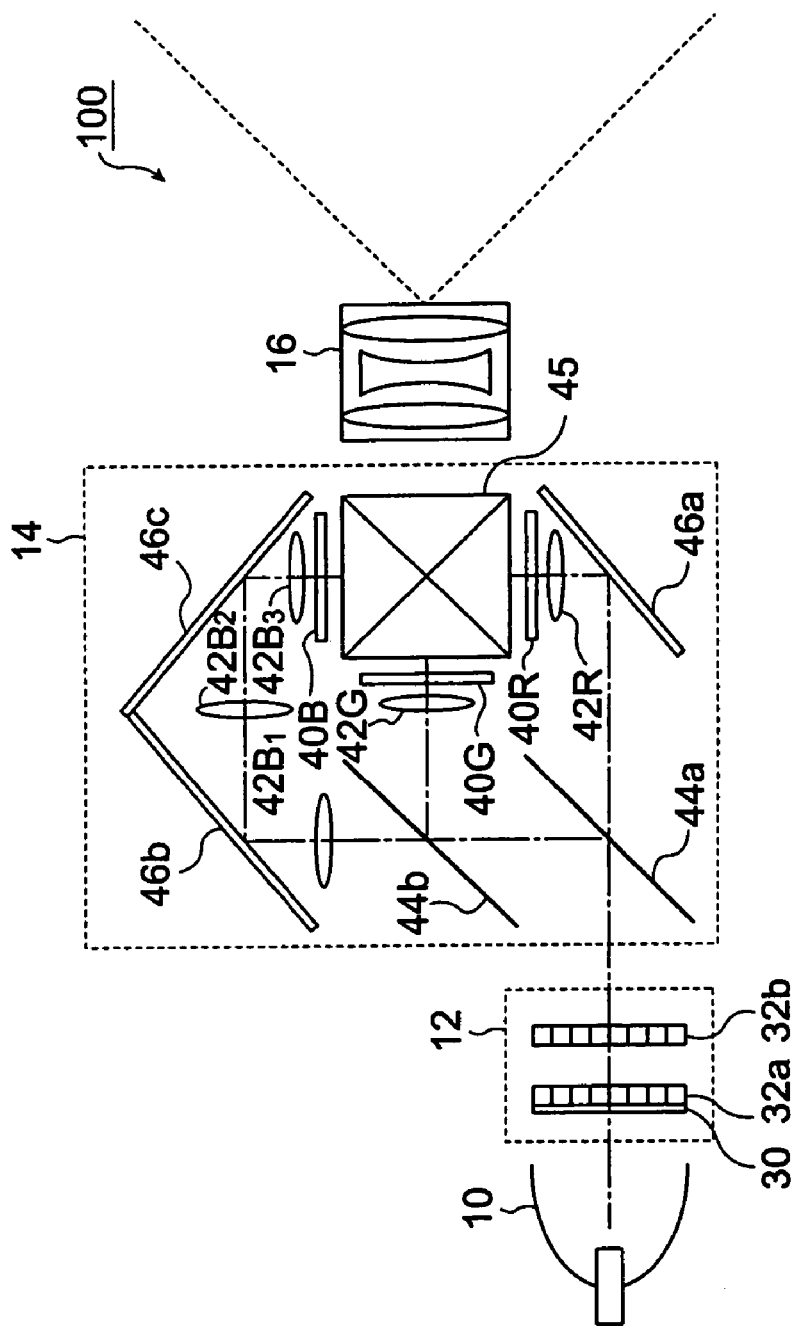
FIG. 11 is a schematic showing the main optical structure of a projection type display device 100 when a luminance modulation light valve is provided in the preceding stage to a color modulation light valve.

According to the exemplary embodiment, the projection type display device 100 has the luminance modulation light valve in the succeeding stage to the color modulation light valves, but the luminance modulation light valve may be provided in the preceding stage to the color modulation light valves, as shown in FIG. 11.

FIG. 11 is a schematic showing the main optical configuration when the luminance modulation light valve in the projection type display device 100 is provided in the preceding stage to the color modulation light valves.

As shown in FIG. 11, in the preceding stage to the color modulation light valve, there is the luminance modulation portion 12 including a liquid crystal light valve 30 having a matrix of pixels whose transmittance can be independently controlled, and two flyeye lenses 32*a* and 32*b*. The luminance in the entire wavelength region of light from the light source 10 is modulated by the liquid crystal light valve 30, and the modulated light is emitted to the color modulation portion 14 through the flyeye lenses 32a and 32b.

In the projection type display device 100 shown in FIG. 11, the luminance modulation portion 12 and the color modulation portion 14 are optically directly connected. Meanwhile, instead of the configuration, as shown in FIG. 12, a relay lens 50 may be provided between the luminance modulation portion 12 and the color modulation portion 14.

Figure 12:
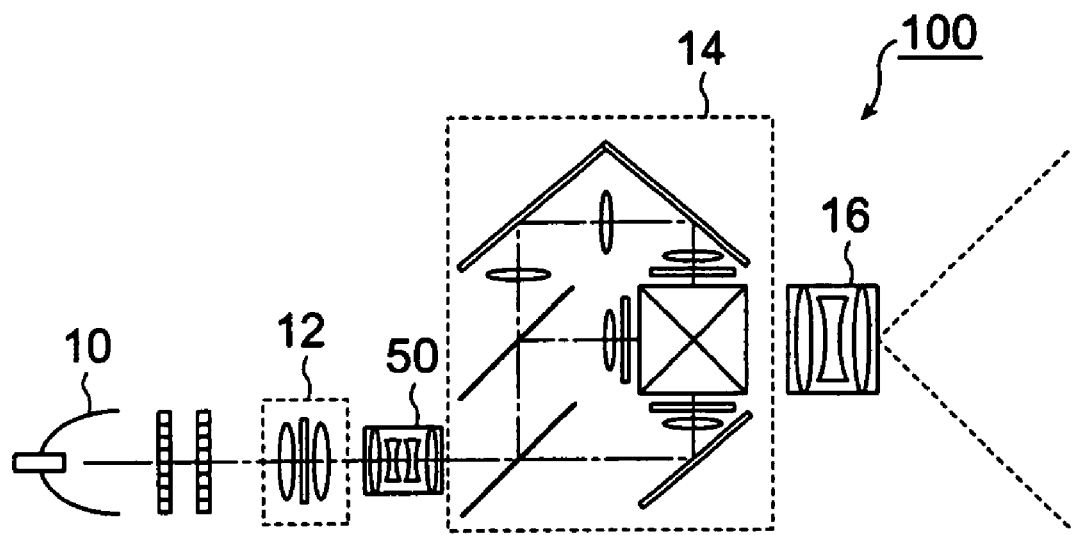
FIG. 12 is a schematic showing the main optical structure of a projection type display device 100 when a luminance modulation light valve is provided in the preceding stage to a color modulation light valve.

FIG. 12 is a schematic showing the main optical configuration of the projection type display device 100 when the luminance modulation light valve is provided in the preceding stage to the color modulation light valves.

Figure 13:
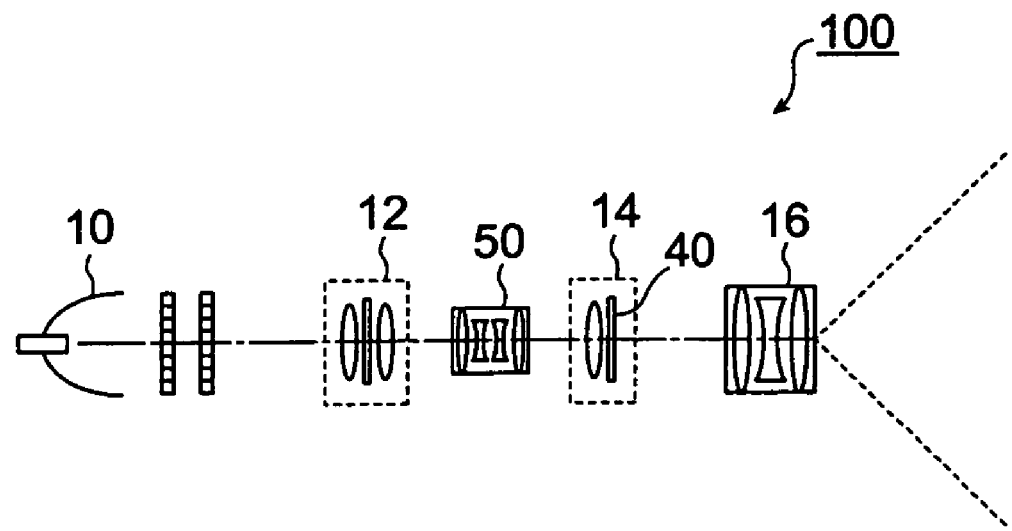
FIG. 13 is a schematic showing the main optical structure of a projection type display device 100 implemented as a single plate type device.

The projection type display device 100 shown in FIGS. 1, 11, and 12 carries out color modulation using the three-plate type, color modulation portion 14 (color modulation by three liquid crystal light valves 40R to 40B), while the color modulation portion 14 may be a single plate type device (that carries out color modulation by a single liquid crystal light valve 40) as shown in FIG. 13. The single plate type color modulation light valve may be provided for example by color filters to the liquid crystal light valve. In this case, in order to enhance the image forming precision, a relay lens 50 is preferably provided between the luminance modulation portion 12 and the color modulation portion 14.

According to the exemplary embodiment, if a plurality of pixels (four pixels for example) in the luminance modulation light valve corresponding to each of the pixels in the color modulation light valve display the same content, the series of processing steps to convert the RGB values into the YCbCr values to obtain RGB pixel values with averaged color components may be omitted. In this way, the processing to the corresponding pixels can be reduced, so that the processing can be carried out at higher speed.

Exemplary Modification

Figure 14:
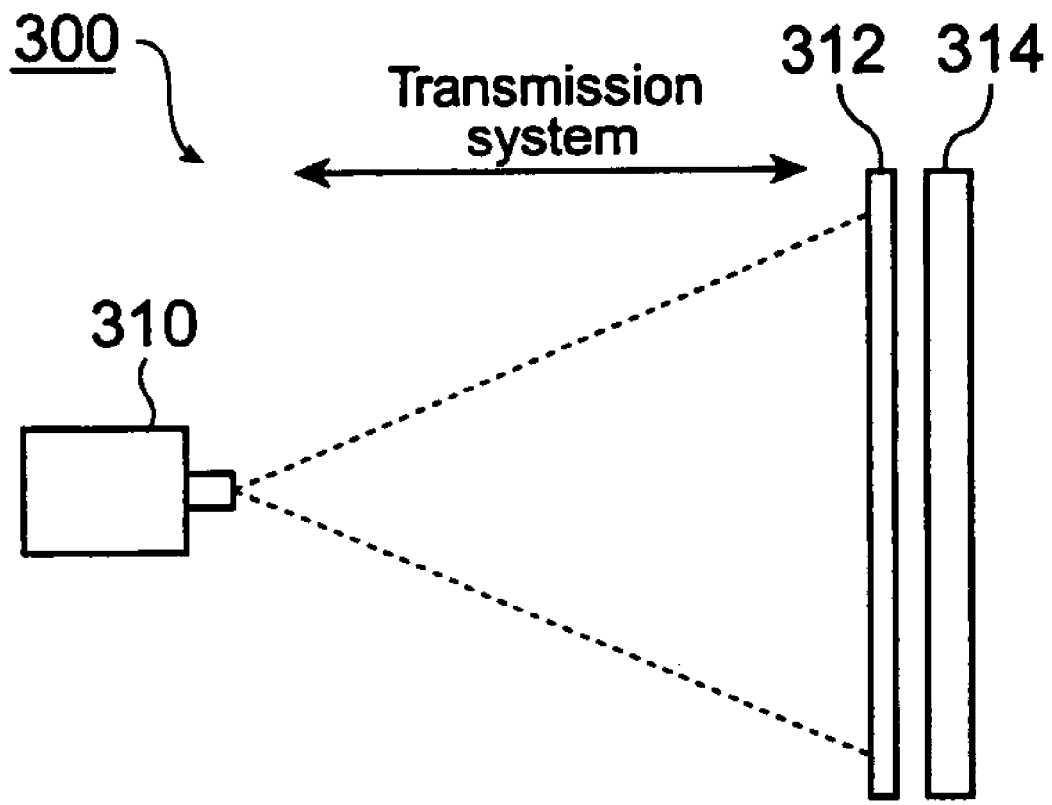
FIG. 14 is a schematic showing the main optical structure of a projection type display device 100 implemented with a relay lens 50 provided between a luminance modulation portion 12 and a color modulation portion 14.

With reference to FIGS. 14 to 18, a modification of the exemplary embodiment will be described. FIG. 14 is a schematic showing the main optical configuration of a direct-view type display system 300.

According to the above described exemplary embodiment, the projection type display device 100 stores the color modulation portion 14 and the luminance modulation portion 15. Meanwhile, as shown in FIG. 14, the projecting portion 16 may be removed and the device may be implemented as the direct-view type display system 300 that includes a three-plate type projecting display device 310 that modulates the luminance of light for each of three RGB primary colors, a light projection type, Fresnel lens 312 that receives projected light from the three-plate type projecting display device 310, and a direct-view type luminance modulation panel 314 provided on the output side of the Fresnel lens 312 to modulate the luminance of light in the entire wavelength region.

In this example, the three-plate type projecting display device 310 is a three-plate, high temperature polysilicon TFT liquid crystal color panel projecting system and its resolution is four×three pixels in a matrix of rows and columns. Meanwhile, the luminance modulation panel 314 is a single plate luminance amorphous silicon TFT liquid crystal display panel without color filters and its resolution is eight×six pixels in a matrix of rows and columns. More specifically, the resolution in the row and column directions of the luminance modulation panel 314 is exactly twice the resolution in the row and column direction of the three-plate type projecting display 310. In the above described exemplary embodiment, when the transmittance T2 of each of the pixels in the luminance modulation light valve is determined, the RGB pixel values of the re-sized image are used as Rp in the expression (1), while according to the modification, RGB" pixel values based on the average value of CbCr calculated after converting the RGB pixel values of the re-sized image into the YCbCr pixel values are used as Rp in the expression (1). Therefore, according to the modification, the display control portion 200 in the exemplary embodiment additionally includes the capability of obtaining the RGB" pixel values and the transmittance T2 using the RGB" pixel values.

According to the exemplary modification, one pixel in the color modulation light valve and four pixel in the luminance modulation light valve are arranged to correspond in a precise manner as shown in FIGS. 5(a) and 5(b) as with the above described exemplary embodiment.

Now, the processing carried out by the CPU 170 of the display control portion 200 according to the exemplary modification will be described.

Figure 15:
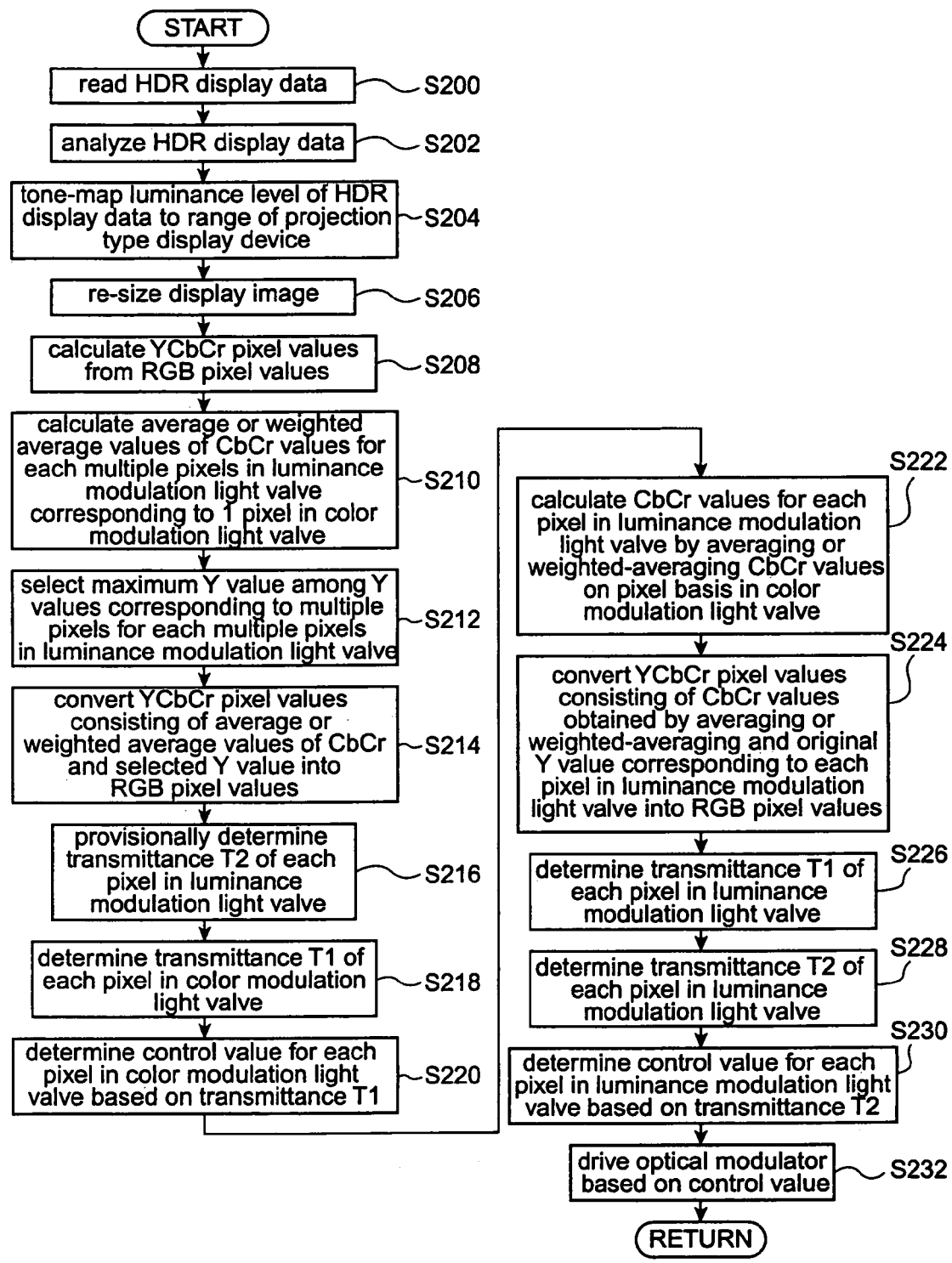
FIG. 15 is a flowchart for use in illustration of display control processing in a modification.

The CPU 170 activates a prescribed program stored in a prescribed region of a ROM 172 and carries out display control processing shown in the flowchart in FIG. 15 according to the program.

FIG. 15 is a flowchart for use in illustration of the display control processing according to the exemplary modification.

The process from steps S200 to S220 in the flowchart in FIG. 15 is the same as the process from steps S100 to S1120 in the flowchart in FIG. 3 according to the exemplary embodiment and therefore will not be described.

In step S222, values $Cb_{ave2}$ and $Cr_{ave2}$ of each of the pixels in the luminance modulation light valve are obtained by calculating the average or weighted average of the Cb and Cr values on a pixel-basis in the color modulation light valve, and the process proceeds to step S224.

In step S224, the YCbCr pixel values of each of the pixels in the luminance modulation light valve consisting of the Y value in the YCbCr pixel values corresponding to each of the pixels in the luminance modulation light valve and the average or weighted average of the Cb and Cr values of each of the pixels in the luminance modulation light valve calculated in step S222 are converted into RGB pixel values, i.e., RGB" pixel values. The process then proceeds to step S226.

In step S226, based on the transmittance T1 determined based on the control registration table in step S220 (corresponding to step S120 described above), the transmittance T1 is determined on a pixel-basis in the luminance modulation light valve, and the process proceeds to step S228.

In step S228, the RGB" pixel values obtained in step S224 are substituted for Rp in the expression (1), and based on the Rp, the luminance Rs of the light source 10, and the transmittance T1 determined in step S226, the transmittance T2 is calculated on a pixel-basis in the luminance modulation light valve, and the process proceeds to step S230.

In step S230, a control value corresponding to the transmittance T2 calculated for each of the pixels in the luminance modulation light valve is read out from the control value registration table, and the read out control value is determined as the control value for the pixel. Then, the process proceeds to step S232.

In step S232, the control values determined in step S220 (corresponding to step S120 described above) and step S230 are output to a light valve driving device 180. The color modulation light valves and the luminance modulation light valve are driven to project a display image, then the series of process steps end and the process returns to the original processing.

Figure 16:
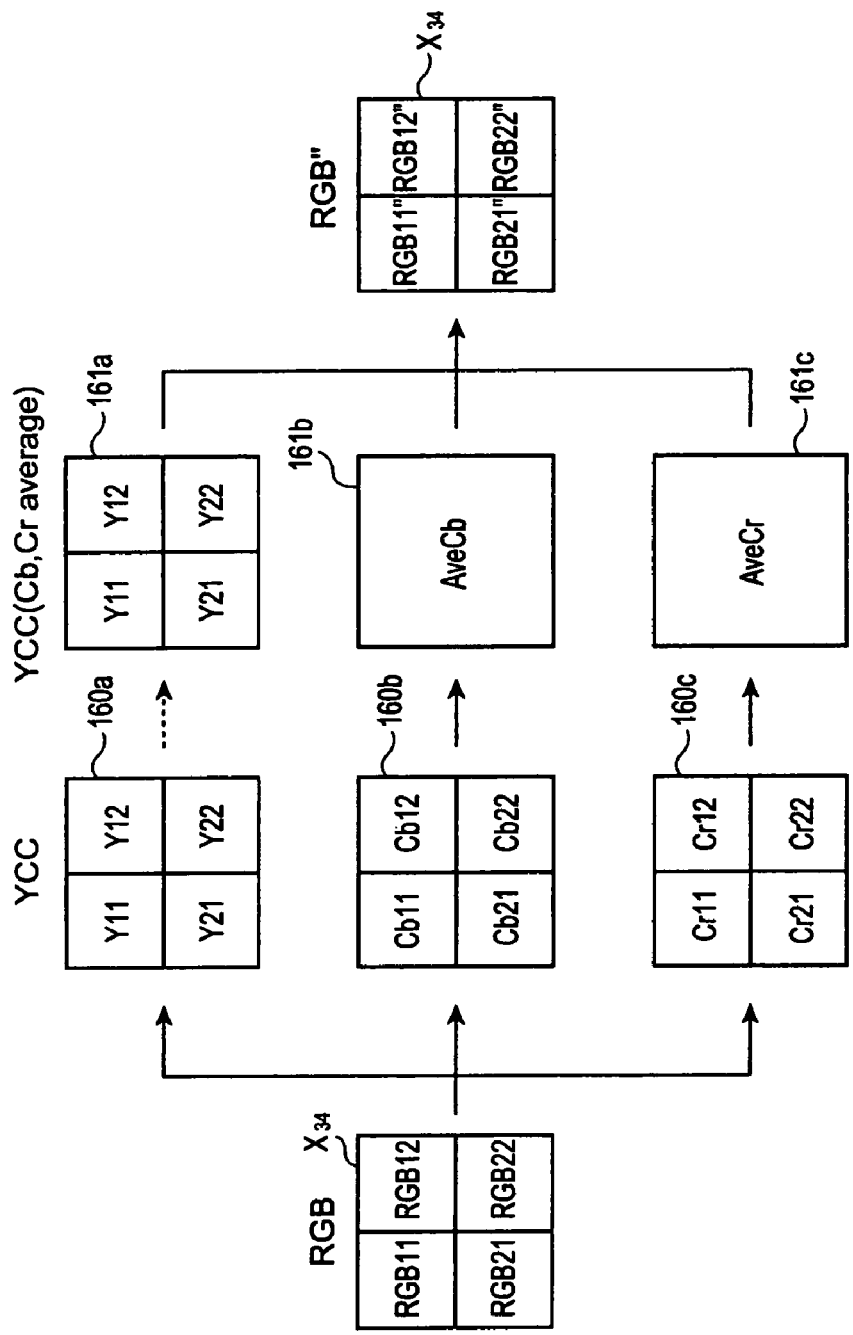
FIG. 16 is a schematic showing the concept of how to obtain RGB" pixel values using a result of pixel converting processing to RGB pixel values corresponding to the pixel block $X_{34}$.

The operation of the exemplary modification corresponding to the process from steps S222 to S232 will be described with reference to FIG. 16. FIG. 16 is a schematic showing the concept of how to carry out the process of obtaining RGB"

values using the result of pixel value conversion processing to RGB pixel values corresponding to the pixel block $X_{34}$.

After steps S200 to S220 and then step S222, the values $Cb_{ave2}$ and $Cr_{ave2}$ of each of the pixels in the luminance modulation light valve are calculated. More specifically, in step S208, as denoted by 160a to 160c in FIG. 16, the RGB pixel values of the re-sized image are converted into YCbCr pixel values according to the expressions (3) to (5). Then, based on the values Cb (160b in FIG. 16) and Cr (160c in FIG. 16) obtained in step S208, the average $Cb_{ave2}$ of $Cb_{11}$ to $Cb_{22}$ in 160b and the average $Cr_{ave2}$ of $Cr_{11}$ to $Cr_{22}$ in 160c are calculated as denoted by 161b and 161c in FIG. 16.

Using the values the same as those according to the exemplary embodiment, from the expressions (3) to (5), $Cb_{ave}$ is "7.5" and $Cr_{ave}$ is "−4.7." According to the exemplary modification, as shown in FIGS. 5(a) and 5(b), one pixel in the color modulation light valve and four pixels in the luminance modulation light valve are arranged to exactly correspond, and therefore the average of $Cb_{11}$ to $Cb_{22}$ and the average of $Cr_{11}$ to $Cr_{22}$ are simply determined as $Cb_{ave2}$ and $Cr_{ave2}$. However, if there is no such exact corresponding relation between the pixels in the color modulation light valve and the luminance modulation light valve, the area ratio or the like, is used to calculate weighted average values. How to calculate a weighted average is described in connection with the above exemplary embodiment, and therefore will not be described.

After step S224, the YCbCr pixel values consisting of the Y value obtained in step S208 and $Cb_{ave2}$ and $Cr_{ave2}$ obtained in step S222 are converted into RGB" pixel values. More specifically, the YCbCr values, i.e., the YCbCr ($A_{34}$) to YCbCr ($D_{34}$) corresponding to the four pixels in the luminance modulation light valve and consisting of the Y values ($Y_{11}$ to $Y_{22}$) of the four pixels in the luminance modulation light valve denoted by 161a in FIG. 16 and $Cb_{ave2}$ and $Cr_{ave2}$ are converted into RGB pixel values according to the expressions (6) to (8), and RGB11" to RGB22", are obtained. Using the same values as those of the exemplary embodiment for the Y values, based on $Cb_{ave2}$ (7.5) and $Cr_{ave2}$ (−4.7), RGB11": (0, 4.6, 16.8), RGB12": (4.0, 11.2, 23.4), RGB21": (8.8, 16.0, 28.2), and RGB"22: (13.0, 20.2, 32.6) result from the expressions (6) to (8).

After step S226, the transmittance T1 on a pixel-basis in the luminance modulation light valve is determined from the transmittances T1 determined in step S220. According to the exemplary embodiment, as shown in FIGS. 5(a) and 5(b), one pixel in the color modulation light valve and four pixels in the luminance modulation light valve are arranged to exactly correspond, and therefore the average of T1(R) to T1(B) determined in step S220 is simply determined as T1 for the four pixels in the luminance modulation light valve. However, if there is no such exact corresponding relation between the pixels, the area ratio or the like is used to calculate the weighted average. How to calculate a weight average is described in connection with the above exemplary embodiment, and therefore will not be described.

More specifically, using the same values as those of the exemplary embodiment, the transmittances T1($A_{34}$)(R, G, B) to T1($D_{34}$)(R, G, B) of the pixels $A_{34}$ to $D_{34}$ in the luminance modulation light valve are all (0.007, 0.010, 0.018).

After step S228, the transmittance T2 on a pixel-basis in the luminance modulation light valve is determined. More specifically, the pixel block $X_{34}$ in the luminance modulation light valve will be described. The RGB" pixel values obtained in step S226, (R11", $G_{11}$", $B_{11}$")=(0, 4.6, 16.8), (R12", G12", B12")=(4.0, 11.2, 23.4), (R21", G21", B21")=(8.8, 16.0, 28.2), and (R22", G22", B22")=(13.0, 20.2, 32.6) are substituted for Rp in the expression (1) for the pixels $D_{34}$ to $A_{34}$.

Using the values and the luminance Rs of the light source 10, Rs(R, G, B)=(10000, 10000, 10000), values Tp for the pixels $D_{34}$ to $A_{34}$ are calculated. In this way, Tp($D_{34}$)=(0.00000, 0.00046, 0.00168), Tp($C_{34}$)=(0.00040, 0.00112, 0.00234), Tp($B_{34}$)=(0.00088, 0.00160, 0.00282), and Tp($A_{34}$)= (0.00130, 0.00202, 0.00326) result.

Using Tp($A_{34}$) to Tp($D_{34}$), the transmittances T1($A_{34}$)(R, G, B) to T1($D_{34}$)(R, G, B)=(0.007, 0.010, 0.018) determined in step S226, and the gain G=1, transmittances T2(T2($A_{34}$) to T2($D_{34}$)) of the pixels $A_{34}$ to $D_{34}$ are calculated according to the expression (2) in the same way as the above described exemplary embodiment. In this way, T2($A_{34}$)=0.190, T2($B_{34}$) =0.110, T2($C_{34}$)=0.0826, and T2($D_{34}$)=0.0464 result.

After step S230, a control value for each of the pixels in the luminance modulation light valve is determined from the transmittances T2 determined in step S228. According to the exemplary embodiment, control values are selected from the control value registration table 800 for the luminance modulation light valve (liquid crystal light valve 30) stored in the storage device 182 similarly to the exemplary embodiment described above. When the control values are obtained from the control value registration table 800, the values (0.15, 0.15, 0.090, 0.038) that are the closest to T2($A_{34}$)=0.1896, T2($B_{34}$) =0.1475, T2($C_{34}$)=0.0997, and T2($D_{34}$)=0.0464 result. The control values (9, 9, 8, 6) corresponding to these values are read out as control values for the pixels $A_{34}$ to $D_{34}$ in the pixel block $X_{34}$ in the liquid crystal light valve 30.

After step S232, the determined control values are output to the light valve driving device 180. In this way, the color modulation light valves and the luminance modulation light valve are driven and a display image is projected.

With the advent of recent technological developments in the field of liquid crystal display panels, a general amorphous silicon TFT liquid crystal display panel may be applied as it is in terms of the pixel structure to the luminance modulation panel 314. More specifically, the general amorphous silicon TFT liquid crystal display panel needs only be removed of color filters or the color filters may be replaced by monochrome filters for use. Therefore, the related art production lines can be used, which is advantageous in terms of the cost. More specifically, a projection type display device capable of high picture quality display can be provided less costly.

Figure 17:
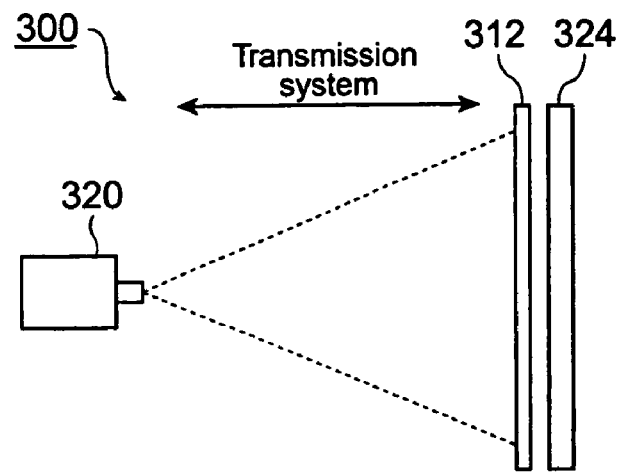
FIG. 17 is a schematic showing the main optical structure of a direct-view type display system 300.

Instead of the construction in FIG. 14, as shown in FIG. 17 the device may be formed as a direct-view type display system 300 that includes a single plate, projection type display device 320 that modulates the luminance of light in the entire wavelength region, a light projection type, Fresnel lens 312 that receives projected light from the single plate, projection type display device 320, and a color modulation panel 324 provided on the output side of the Fresnel lens 312 to modulate the luminance of light for each of the three RGB primary colors. In this case, the same display processing as that described above can be carried out.

Figure 18:
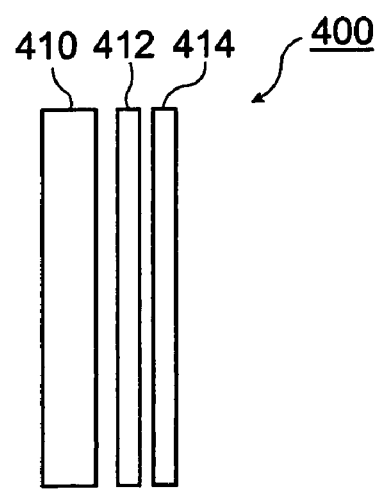
FIG. 18 is a schematic showing the main optical structure of a display 400.

According to the exemplary embodiment, the projection type display device 100 includes the color modulation portion 14 and the luminance modulation portion 15, while as shown in FIG. 18, the projecting portion 16 may be removed and the device may be formed as a display 400 that includes a back light 410, a luminance modulation panel 412 provided on the output side of the back light 410 to modulate the luminance of light in the entire wavelength region, and a color modulation panel 414 provided on the output side of the luminance modulation panel 412 to modulate the luminance of light for each of the three RGB primary colors. In this case, the same display processing as that described above can be carried out.

As in the foregoing, the projection type display device 100 according to the exemplary modification provides the following advantages. The transmittance T2 of each of the pixels in the luminance modulation light valve is determined using the RGB" pixel values based on the average of the values Cb and Cr corresponding to the pixels in the color modulation light valve, so that more appropriate transmittance values T2 can be provided as compared to the case of using the RGB pixel values of a re-sized image, which can enhance the picture quality of the display image.

EXAMPLES

Now, errors among a target luminance value for an HDR image to be displayed, a display luminance value obtained by the related art method, a display luminance value obtained in the processing according to the exemplary embodiment described above, and a display luminance value obtained in the processing according to the exemplary modification are obtained and the advantages according to exemplary embodiments of the invention will be evaluated.

In the following example, one pixel in the color modulation light value exactly corresponds to four pixels (pixels 0 to 3) in the luminance modulation light valve.

In the following, the target pixel values of pixels 0 to 3 in the luminance modulation light valve are shown.

RGB pixel values for pixel 0: (1.0000, 1.0000, 25.5000)
RGB pixel values for pixel 1: (5.1000, 10.2000, 25.5000)
RGB pixel values for pixel 2: (1.0000, 20.4000, 25.5000)
RGB pixel values for pixel 3: (15.3000, 20.4000, 25.5000)

In the following, pixel values obtained by converting the target RGB pixel values into YCbCr values are shown.

YCbCr pixel values for the pixel 0:(3.8048, 12.2500, −1.9921)
YCbCr pixel values for the pixel 1:(10.4271, 8.5106, −3.7940)
YCbCr pixel values for the pixel 2:(15.1850, 5.8236, −10.1147)
YCbCr pixel values for the pixel 3:(19.4594, 3.4106, −2.9647)

The average of the RGB pixel values, the average of the YCbCr pixel values, the maximum value for the luminance Y among the YCbCr pixel values for the pixels 0 to 3, the luminance of the light source, and the provisional transmittance T2 are as follows.

The average of the RGB pixel values: (5.6000, 13.0000, 25.5000)
The average of the YCbCr pixel values: (12.2191, 7.4987, −4.7164)
The maximum value for the luminance Y, $Y_{max}$=19.4594
The luminance of the light source LS=10000.0000
The provisional transmittance T2=0.2000

(1) Display luminance values obtained by simply averaging the RGB pixel values are as follows.

Transmittance T1=the average of RGB/(LS×provisional transmittance T2)
Transmittance T1 (for RGB): (0.0028, 0.0065, 0.0127)
Transmittance T2=target pixel values for RGB/(LS×transmittance T1)
The transmittances T2 of the pixels 0 to 3 and the average thereof are as follows:
The transmittance T2 of the pixel 0 for RGB: (0.0357, 0.0154, 0.2000)
The average $T2_{ave}$=0.0837
The transmittance T2 of the pixel 1 for RGB: (0.1821, 0.1569, 0.2000)
The average $T2_{ave}$=0.1797
The transmittance T2 of the pixel 2 for RGB: (0.0357, 0.3138, 0.2000)
The average $T2_{ave}$=0.1832
The transmittance T2 of the pixel 3 for RGB (0.5464, 0.3138, 0.2000)
The average $T2_{ave}$=0.3534
The pixel display values obtained by inverse operation based on T1 and $T2_{ave}$ are as follows.
RGB pixel values for the pixel 0: (2.3436, 5.4405, 10.67417)
RGB pixel values for the pixel 1: (5.0313, 11.6798, 22.9103)
RGB pixel values for the pixel 2: (5.1292, 11.9071,23.3563)
RGB pixel values for the pixel 3: (9.8959, 22.9726, 45.0617)
YCbCr pixel values obtained from the RGB pixel values for the pixels 0 to 3 are as follows.
YCbCr pixel values for the pixel 0: (5.1137, 3.1382, −1.9738)
YCbCr pixel values for the pixel 1: (10.9781, 6.7371, −4.2374)
YCbCr pixel values for the pixel 2: (11.1919, 6.8683, −4.3199)
YCbCr pixel values for the pixel 3: (21.5926, 13.2511, −8.3344)

(2) Pixel values for determining the transmittance T1 obtained based on $Y_{max}$, and the average values of Cb and Cr are as follows when the values Cb and Cr of the YCbCr pixel values for the pixels 0 to 3 are obtained by averaging (by the method according to the above described exemplary embodiment).

RGB pixel values: (12.9933, 20.2319, 32.4471)
Transmittance T1=RGB'/(LS×provisional transmittance T2)
Transmittance T1 (for RGB): (0.0065, 0.0101, 0.0162)
Transmittance T2=target pixel values for RGB/(LS×transmittance T1)
Transmittances T2 and its average for the pixel 0 to 3 are as follows:
The transmittance T2 of the pixel 0 for RGB: (0.0154, 0.0099, 0.1572)
The average $T2_{ave}$=0.0608
The transmittance T2 of the pixel 1 for RGB: (0.0785, 0.1008, 0.1572)
The average $T2_{ave}$=0.1122
The transmittance T2 of the pixel 2 for RGB: (0.0154, 0.2017, 0.1572)
The average $T2_{ave}$=0.1247
The transmittance T2 of the pixel 3 for RGB (0.2355, 0.2017, 0.1572)
The average $T2_{ave}$=0.1981
Pixel display values for the pixels 0 to 3 calculated by inverse operation based on the transmittance T1 and $T2_{ave}$ are as follows:
RGB pixel values for the pixel 0: (3.9512, 6.1524, 9.8670)
RGB pixel values for the pixel 1: (7.2873, 11.3471, 18.1981)
RGB pixel values for the pixel 2: (8.1042, 12.6191, 20.2380)
RGB pixel values for the pixel 3: (12.8709, 20.0413, 32.1414)
YCbCr pixel values obtained from the RGB pixel display values for the pixels 0 to 3 are as follows.
YCbCr pixel values for the pixel 0: (5.9197, 2.2287, −1.4026)
YCbCr pixel values for the pixel 1: (10.9179, 4.1105, −2.5870)

YCbCr pixel values for the pixel 2: (12.1417, 4.5713, −2.8769)

YCbCr pixel values for the pixel 3: (19.2832, 7.2600, −4.5691)

(3) When target RGB values are corrected using the average values of Cb and Cr in YCbCr pixel values for the pixels 0 to 3 (a modification).

Transmittance T1 (the same as in (2)): (0.0065, 0.0101, 0.0162)

Transmittance T2=RGB"/(LS×T1)

The pixel values RGB" to determine the transmittance T2 of the pixel 0 obtained from Y (the original Y) in the YCbCr pixel values for the pixel 0 and the averages of Cb and Cr on a pixel-basis in the color modulation light valve: (−2.6614, 4.5772, 16.7925)

The transmittance T2 of the pixel 0 for RGB (−0.0410, 0.0452, 0.1035)

The average $T2_{ave}$=0.0359

The pixel values RGB" to determine the transmittance T2 of the pixel 1 obtained from Y (the original Y) in the YCbCr pixel values for the pixel 1 and the averages of Cb and Cr on a pixel-basis in the color modulation light valve: (3.9610, 11.1996, 23.4148)

The transmittance T2 of the pixel 1 for RGB (0.0610, 0.1107, 0.1443)

The average $T2_{ave}$=0.1053

The pixel values RGB" to determine the transmittance T2 of the pixel 2 obtained from Y (the original Y) in the YCbCr pixel values for the pixel 2 and the averages of Cb and Cr on a pixel-basis in the color modulation light valve: (8.7188, 15.9575, 28.1727)

The transmittance T2 of the pixel 2: (0.1342, 0.1577, 0.1737)

The average $T2_{ave}$=0.1552

The pixel values RGB" to determine the transmittance T2 of the pixel 3 obtained from Y (the original Y) in the YCbCr pixel values for the pixel 3 and the averages of Cb and Cr on a pixel-basis in the color modulation light valve: (12.9933, 20.2319, 32.4471)

The transmittance T2 of the pixel 3 (0.2000, 0.2000, 0.2000)

The average $T2_{ave}$=0.2000

The pixel display values for the pixels 0 to 3 obtained by inverse operation based on the transmittances T1 and $T2_{ave}$ are as follows.

The RGB pixel values for the pixel 0: (2.3342, 3.6346, 5.8291)

The RGB pixel values for the pixel 1: (6.8433, 10.6557, 17.0892)

The RGB pixel values for the pixel 2: (10.0829, 15.7001, 25.1792)

The RGB pixel values for the pixel 3: (12.9933, 20.2319, 32.4471)

The YCbCr pixel values obtained from the RGB pixel display values for the pixels 0 to 3 are as follows.

The YCbCr pixel values for the pixel 0: (3.4971, 1.3167, −0.8286)

The YCbCr pixel values for the pixel 1: (10.2526, 3.8601, −2.4293)

The YCbCr pixel values for the pixel 2: (15.1062, 5.6874, −3.5794)

The YCbCr pixel values for the pixel 3: (19.4666, 7.3291, −4.6125)

(4) Comparison of Luminance Errors

Based on the following expression (14) about luminance errors, errors between the pixel display values obtained according to the above methods (1) to (3) and the target luminance values are obtained.

$$\text{Luminance error} = ((\text{the target luminance of pixel } 0 - \text{the display luminance of the pixel } 0)^2 + (\text{the target luminance of the pixel } 1 - \text{the display luminance of the pixel } 1)^2 + (\text{the target luminance of the pixel } 2 - \text{the display luminance of the pixel } 2)^2 + (\text{the target luminance of the pixel } 3 - \text{the display luminance of the pixel } 3)^2)^{1/2} \quad (14)$$

Luminance error in (1) Gosa_RGB_Y=4.7447

Luminance error in (2) Gosa_YCC_Y=3.7425

Luminance error in (3) Gosa_YCC2_Y=0.3624

Consequently, (3) is the most advantageous in the capability of holding the luminance, followed by (2) and then (1). Therefore, in the cases of (2) and (3) according to exemplary embodiments of the invention, HDR images can be displayed with luminance closer to the target luminance than the related art case (1).

According to the above described exemplary embodiment, the luminance modulation light valve (liquid crystal light valve 30) corresponds to the luminance adjusting element according to any one of Inventive Exemplary Aspects 1, 2, 5 to 10, 13, 14, 17 to 19, 22, 23, 26 to 30, and 21.

According to the above described exemplary embodiment, the color modulation light valve (liquid crystal light valves 40R to 40B) corresponds to the optical modulator according to any one of Inventive Exemplary Aspects 1, 2, 4, 5, 7 to 9, 13, 14, 16, 19, 22, 23, 25, and 28 to 30.

According to the above described exemplary embodiment, the processing of converting the RGB pixel values of a re-sized image into YCbCr pixel values using the display control device 200 corresponds to the first pixel value converting device according to any one of Inventive Exemplary Aspects 2, 3, 14, and 15.

According to the above described exemplary embodiment, the processing of calculating the average value of the YCbCr values on a pixel-basis in the color modulation light valve using the display control device 200 corresponds to the average value calculating device according to any one of Inventive Exemplary Aspects 1, 2, 6, 10, 13, 14, and 18.

According to the above described exemplary embodiment, the processing of selecting $Y_{max}$ from YCbCr values on a pixel-basis in the color modulation light valve using the display control device 200 corresponds to the luminance selecting device according to any one of Inventive Exemplary Aspect 1, 2, 4, 13, 14, and 16.

According to the above described exemplary embodiment, the processing of converting YCbCr pixel values consisting of the average values of Cb values and Cr values on a pixel-basis in the color modulation light valve into RGB pixel values using the display control device 200 corresponds to the second pixel value converting device according to Inventive Exemplary Aspect 2 or 14.

According to the above described exemplary embodiment, the processing of provisionally determining the transmittance T2 of each of the pixels in the luminance modulation light valve using the display control device 200 corresponds to the optical propagation characteristic provisionally determining device according to any one of Inventive Exemplary Aspects 2, 7, and 19.

According to the above described exemplary embodiment, the processing of determining the transmittance T1 of each of the pixels in the color modulation light valve using the display control device 200 corresponds to the optical propagation characteristic determining device according to Inventive Exemplary Aspect 1 or 13, and the first optical propagation characteristic determining device according to any one of Inventive Exemplary Aspects 2, 5, 6, 7, 14, 17, 18, and 19.

According to the above described exemplary embodiment, the processing of determining a control value for each of the pixels in the color modulation light valve using the display control device 200 corresponds to the control value determining device according to Inventive Exemplary Aspect 1 or 13 and the first control value determining device according to Inventive Exemplary Aspect 2 or 14.

According to the above described exemplary embodiment, the processing of determining the transmittance T2 of each of the pixels in the luminance modulation light valve using the display control device 200 corresponds to the second optical propagation characteristic determining device according to any one of Inventive Exemplary Aspects 2, 5, 6, 14, 17, and 18.

According to the above described exemplary embodiment, the processing of determining a control value for each of the pixels in the luminance modulation light valve using the display control device 200 corresponds to the second control value determining device according to Inventive Exemplary Aspect 2 or 14.

According to the above described exemplary embodiment, the processing of producing YCbCr values in the luminance modulation light valve based on the average values of Cb values and Cr values using the display control device 200 corresponds to the third pixel value producing device according to Inventive Exemplary Aspect 6 or 18.

According to the above described exemplary embodiment, the processing of converting YCbCr pixel values in the luminance modulation light valve based on the average values of Cb values and Cr values into RGB pixel values using the display control device 200 corresponds to the third pixel value converting device according to Inventive Exemplary Aspect 6 or 18.

According to the above described exemplary embodiment, steps S108 and S208 correspond to the first pixel value converting according to any one of Inventive Exemplary Aspects 18, 20, 23, and 24.

According to the above described exemplary embodiment, steps S110 and S210 correspond to the average value calculating according to any one of Inventive Exemplary Aspects 18, 19, 20, 22, 23, and 27.

According to the above described exemplary embodiment, steps S112 and S212 correspond to the luminance selecting according to any one of Inventive Exemplary Aspects 18 to 20, 22, and 23.

According to the above described exemplary embodiment, steps S114 and S214 correspond to the second pixel value converting according to any one of Inventive Exemplary Aspects 18, 20, and 23.

According to the above described exemplary embodiment, steps S116 and S216 correspond to the optical propagation characteristic provisionally determining according to any one of Inventive Exemplary Aspects 18, 23, and 28.

According to the above described exemplary embodiment, steps S118 and S120, and steps S218 and S220 correspond to the optical propagation characteristic determining according to Inventive Exemplary Aspect 22 and the first optical propagation characteristic determining step according to any one of Inventive Exemplary Aspects 23, 26, 27, and 28.

According to the above described exemplary embodiment, step S120 corresponds to the control value determining according to Inventive Exemplary Aspect 22 or the first control value determining according to Inventive Exemplary Aspect 23.

According to the above described exemplary embodiment, steps S122 and S124, and steps S226 and S228 correspond to the second optical propagation characteristic determining according to any one of Inventive Exemplary Aspects 23, 26, and 27.

According to the above described exemplary embodiment, steps S126 and S230 correspond to the second control value determining according to Inventive Exemplary Aspect 23.

According to the above described exemplary embodiment, steps S222 and S224 correspond to the third pixel value producing and the third pixel value converting according to Inventive Exemplary Aspect 27.

Note that According to the above described exemplary embodiment, an active matrix type liquid crystal display device is used for the liquid crystal light valves 30, 40B, 40G, and 40R. Alternatively, a passive matrix type liquid crystal display device and a segment type liquid crystal display device may be used for the liquid crystal light valves 30, 40B, 40G, and 40R. The active matrix type liquid crystal display is capable of fine gradation display, while the passive matrix type liquid crystal display device and the segment type liquid crystal display device can be produced inexpensively.

According to the above described exemplary embodiment, the projection type display device 100 includes a transmitting type optical modulator, while, alternatively, a luminance modulation light valve or a color modulation light valve may be made of a reflection type optical modulator such as a DMD (Digital Micromirror Device).

According to the above described exemplary embodiment, a transmission type liquid crystal device is used as the luminance modulation light valve, while, alternatively, a light source type modulator whose luminance can be modulated (such as an LED, an OLED, and a laser) may be used.

According to the above described exemplary embodiment, in order to execute the processing in the flowcharts in FIGS. 3 and 15, a control program stored in the ROM 172 is executed, while, alternatively, a program describing the procedure may be read out from a storage medium storing the program onto the RAM 174 and executed.

In this example, the storage medium may be a semiconductor storage medium such as a RAM and a ROM, a magnetic storage medium such as an FD and an HD, an optical reading storage medium such as a CD, a CDV, an LD, and a DVD, a magnetic storage type/optical reading type storage medium such as an MO. Regardless of whether the medium is read electronically, magnetically, or optically, any storage medium may be used as long as the medium is a storage medium that can be read using a computer.

What is claimed is:

1. An optical display device comprising:
    an optical modulator that has a plurality of pixels having optical propagation characteristics that can be controlled independently and a luminance adjusting element that has a plurality of pixels having optical propagation characteristics that can be controlled independently, the pixels in the optical modulator and the pixels in the luminance adjusting element being arranged to optically correspond at m:n, m and n being integers and m<n or n>m, the optical display device modulating light from a light source through the optical modulator and the luminance adjusting element and displaying an image;
    an average value calculating device to calculate an average value or weighted average value of color component values on a color-basis in pixel values corresponding to the n pixels based on the display image data;
    a luminance selecting device to select a luminance value corresponding to each of the pixels in the optical modulator among luminance component values in the pixel values corresponding to the n pixels based on the display image data;

an optical propagation characteristic determining device to determine the optical propagation characteristic of each of the pixels in the optical modulator based on a result of calculation by the average value calculating device and a result of selection by the luminance selecting device; and a control value determining device to determine a control value for each of the pixels in the optical modulator based on optical propagation characteristics determined by the optical propagation characteristic determining device.

2. The optical display device according to claim 1, the luminance adjusting element being a liquid crystal display device.

3. An optical display device comprising:

an optical modulator that has a plurality of pixels having optical propagation characteristics that can be controlled independently and a luminance adjusting element that has a plurality of pixels having optical propagation characteristics that can be controlled independently, the pixels in the optical modulator and the pixels in the luminance adjusting element being arranged to optically correspond at m:n, m and n being integers and m<n or n>m, the optical display device modulating light from a light source through the optical modulator and the luminance adjusting element and displaying an image;

a first pixel value converting device to convert RGB values corresponding to n pixels in the luminance adjusting element corresponding to m pixels in the optical modulator into first pixel values in which the luminance component and color components of the RGB values are separated based on display image data having the pixels values including the RGB values;

an average value calculating device to calculate an average value or weighted average value of the color component values on a color-basis among the first pixel values corresponding to the n pixels;

a luminance selecting device to select luminance values corresponding to the m pixels in the optical modulator from the luminance component values among the first pixel values corresponding to the n pixels;

a second pixel value converting device to convert second pixel values into RGB values, the second pixel values including a result of calculation by the average value calculating device and a result of selecting by the luminance selecting device;

an optical propagation characteristic provisionally determining device to provisionally determine the optical propagation characteristic of each of the pixels in the luminance adjusting element;

a first optical propagation characteristic determining device to determine the optical propagation characteristic of each of the pixels in the optical modulator based on an optical propagation characteristic provisionally determined by the optical propagation characteristic provisionally determining device and the result of conversion by the second pixel value converting device;

a first control value determining device to determine a control value for each of the pixels in the optical modulator based on the optical propagation characteristic determined by the first optical propagation characteristic determining device;

a second optical propagation characteristic determining device to determine an optical propagation characteristic of each of the pixels in the luminance adjusting element based on the display image data; and a second control value determining device to determine a control value for each of the pixels in the luminance adjusting element based on the optical propagation characteristic determined by the second optical propagation characteristic determining device.

4. The optical display device according to claim 3, the luminance selecting device selecting one of a maximum, intermediate, and minimum values among the luminance component values in the first pixel values corresponding to the n pixels as a luminance value corresponding to each of the pixels in the optical modulator.

5. The optical display device according to claim 3, the second optical propagation characteristic determining device determining the optical propagation characteristic of each of the pixels in the luminance adjusting element based on the display image data and the optical propagation characteristic determined by the first optical propagation characteristic determining device.

6. The optical display device according to claim 5, further comprising:

a third pixel value producing device to produce third pixel values corresponding to the n pixels in the luminance adjusting element based on the luminance component values corresponding to the n pixels in the first pixel values and the result of calculation by the average value calculating device; and a third pixel value converting device to convert the third pixel values into RGB values, and the second optical propagation characteristic determining device determines the optical propagation characteristic of each of the pixels in the luminance adjusting element based on a result of conversion by the third pixel value converting device and the optical propagation characteristic determined by the first optical propagation characteristic determining device.

7. The optical display device according to claim 3, when the pixel values of the display image data corresponding to the n pixels in the luminance adjusting element are the same, the first optical propagation characteristic determining device determining the optical propagation characteristic of each of the pixels in the optical modulator based on the optical propagation characteristic provisionally determined by the optical propagation characteristic provisionally determining device and the pixel values in the display image data.

8. The optical display device, according to claim 3, the optical modulator and the luminance adjusting element both have the pixels arranged in a matrix, the number of pixels in the luminance adjusting element is an integral multiple of the number of pixels in the optical modulator both in the row and column directions, and m pixels in the optical modulator and n pixels in the luminance adjusting element are arranged to regularly and optically correspond.

9. The optical display device according to claim 8, further comprising:

a plurality of the optical modulators corresponding to light in the RGB colors, m pixel in each optical modulator and n pixels in the luminance adjusting element being arranged to regularly and optically correspond.

10. The optical display device according to claim 3, the first pixel value converting device converting the RGB values into first pixel values including a Y value representing the luminance component of the pixel, a Cb value representing color difference for blue in the pixel, and a Cr value representing color difference for red in the pixel.

11. An optical display device comprising:

an optical modulator that has a plurality of pixels having optical propagation characteristics that can be controlled independently and a luminance adjusting light source that has a plurality of light sources having luminance that can be adjusted independently, the pixels in the optical modulator and the light sources in the luminance adjusting light source being arranged to optically correspond at m:n, m and n being integers and m<n or n>m, the optical display device modulating light from the luminance adjusting light source through the optical modulator and displaying an image;

an average value calculating device to calculate an average value or weighted average value of color component values on a color-basis among the pixel values corresponding to the n pixels based on the display image data;

a luminance selecting device to select a luminance value corresponding to each of the pixels in the optical modulator among luminance component values in the pixel values corresponding to the n pixels based on the display image data;

an optical propagation characteristic determining device to determine the optical propagation characteristic of each of the pixels in the optical modulator based on a result of calculation by the average value calculating device and a result of selection by the luminance selecting device; and a control value determining device to determine a control value for each of the pixels in the optical modulator based on optical propagation characteristics determined by the optical propagation characteristic determining device.

12. An optical display device comprising:

an optical modulator that has a plurality of pixels having optical propagation characteristics that can be controlled independently and a luminance adjusting light source that has a plurality of light sources having luminance that can be adjusted independently, the pixels in the optical modulator and light sources in the luminance adjusting light source being arranged to optically correspond at m:n, m and n being integers and m<n or n>m, the optical display device modulating light from the luminance adjusting light source through the optical modulator and displaying an image;

a first pixel value converting device to convert RGB values corresponding to n light sources in the luminance modulating light source corresponding to m pixels in the optical modulator into first pixel values in which the luminance component and color components of the RGB values are separated based on the display image data having pixel values including RGB values;

an average value calculating device to calculate an average value or weighted average value of the color component values on a color-basis among the first pixel values corresponding to the n pixels;

a luminance selecting device to select luminance values corresponding to the m pixels in the optical modulator among the luminance component values in the first pixel values corresponding to the n pixels;

a second pixel value converting device to convert second pixel values consisting of a result of calculation by the average value calculating device and the result of selection by the luminance selecting device;

a luminance provisionally determining device to provisionally determine luminance of each of the light sources in the luminance modulating light source;

an optical propagation characteristic determining device to determine optical propagation characteristic of each of the pixels in the optical modulator based on the luminance provisionally determined by the luminance provisionally determining device and the RGB values obtained by converting by the second pixel value converting device;

a first control value determining device to determine a control value for each of the pixels in the optical modulator based on the optical propagation characteristic determined by the first optical propagation characteristic determining device;

a luminance determining device to determine luminance of each of the light sources in the luminance modulating light source based on the display image data; and a second control value determining device to determine a control value for each of the pixels in the luminance modulating light source based on the luminance determined by the luminance determining device.

13. A computer readable medium storing a program that, when executed by a computer, is operable to control an optical display device having an optical modulator that has a plurality of pixels whose optical propagation characteristics can be controlled independently and a luminance adjusting element that has a plurality of pixels whose optical propagation characteristics can be controlled independently, the pixels in the optical modulator and the pixels in the luminance adjusting element being arranged to optically correspond at m:n, m and n being integers and m<n or n>m, the device modulating light from a light source through the optical modulator and the luminance adjusting element and displaying an image, the program enabling the computer to carry out processing comprising:

calculating an average value or weighted average value of color component values on a color-basis in pixel values corresponding to the n pixels based on the display image data;

selecting a luminance value corresponding to each of the pixels in the optical modulator among luminance component values in the pixel values corresponding to the n pixels based on the display image data;

determining an optical propagation characteristic of each of the pixels in the optical modulator based on a result of calculation by the average value calculating and a result of selection by the luminance selecting; and determining a control value for each of the pixels in the optical modulator based on the optical propagation characteristics determined by the optical propagation characteristic determining.

14. A computer readable medium storing a program that, when executed by a computer, is operable in controlling an optical display device having an optical modulator that has a plurality of pixels whose optical propagation characteristics can be controlled independently and a luminance adjusting element that has a plurality of pixels whose optical propagation characteristics can be controlled independently, the pixels in the optical modulator and the pixels in the luminance adjusting element being arranged to optically correspond at m:n, m and n being integers and m<n or n>m, the optical display device modulating light from a light source through the optical modulator and the luminance adjusting element and displaying an image, the program enabling the computer to carry out processing comprising:

converting RGB values corresponding to n pixels in the luminance adjusting element corresponding to m pixels in the optical modulator into first pixel values in which the luminance component and color components of the RGB values are separated;

calculating an average value or weighted average value of the color component values on a color-basis among the first pixel values corresponding to the n pixels;

selecting luminance values corresponding to the m pixels in the optical modulator from the luminance component values among first pixel values corresponding to the n pixels;

converting second pixel values consisting of a result of calculation by the average value calculating device and a result of selecting by the luminance selecting;

provisionally determining an optical propagation characteristic of each of the pixels in the luminance adjusting element;

determining an optical propagation characteristic of each of the pixels in the optical modulator based on the optical propagation characteristic provisionally determined by the optical propagation characteristic provisionally determining;

determining a control value for each of the pixels in the optical modulator based on the optical propagation characteristic determined by the first optical propagation characteristic determining;

determining the optical propagation characteristic of each of the pixels in the luminance adjusting element based on the display image data; and determining a control value for each of the pixels in the luminance adjusting element based on the optical propagation characteristic determined by the second optical propagation characteristic determining.

15. A computer readable medium storing a program that, when executed by a computer, is operable for controlling an optical display device having an optical modulator that has a plurality of pixels whose optical propagation characteristics can be controlled independently and a luminance adjusting light source that has a plurality of light sources whose luminance can be adjusted independently, the pixels in the optical modulator and the light sources in the luminance adjusting light source being arranged to optically correspond at m:n, m and n being integers and m<n or n>m, the device modulating light from the luminance adjusting light source through the optical modulator and displaying an image, the program enabling the computer to carry out processing comprising:

calculating an average value or weighted average value of color component values on a color-basis in pixel values corresponding to the n pixels based on the display image data;

selecting a luminance value corresponding to each of the pixels in the optical modulator among luminance component values in the pixel values corresponding to the n pixels based on the display image data;

determining an optical propagation characteristic of each of the pixels in the optical modulator based on a result of calculation by the average value calculating device and a result of selection by the luminance selecting; and determining a control value for each of pixels in the optical modulator based on the optical propagation characteristics determined by the optical propagation characteristic determining.

16. A computer readable medium storing a program, that when executed by a computer, is operable for controlling an optical display device having an optical modulator that has a plurality of pixels whose optical propagation characteristics can be controlled independently and a luminance adjusting light source that has a plurality of light sources whose luminance can be adjusted independently, the pixels in the optical modulator and the light sources in the luminance adjusting light source being arranged to optically correspond at m:n, m and n being integers and m<n or n>m, the device modulating light from the luminance adjusting light source through the optical modulator and displaying an image, the program enabling the computer to carry out processing, comprising:

converting RGB values corresponding to n pixels in the luminance adjusting light source corresponding to m pixels in the optical modulator into first pixel values in which the luminance component and color components of the RGB values are separated based on the display image data having pixel values including RGB values;

calculating an average value or weighted average value of the color component values on a color-basis among the first pixel values corresponding to the n pixels;

selecting luminance values corresponding to the m pixels in the optical modulator from the luminance component values among the first pixel values corresponding to the n pixels;

converting second pixel values into RGB values, the second pixel values including a result of calculating by the average value calculating and a result of selection by the luminance selecting;

provisionally determining the luminance of each of the light sources in the luminance modulating light source;

determining an optical propagation characteristic of each of the pixels in the optical modulator based on the luminance provisionally determined by the luminance provisionally determining and the RGB values obtained by converting by the second pixel value converting;

determining a control value for each of the pixels in the optical modulator based on the optical propagation characteristic determined by the first optical propagation characteristic determining;

determining luminance of each of the light sources in the luminance adjusting light sources based on the display image data; and determining a control value for each of the light sources in the luminance modulating light source based on the luminance determined by the luminance determining.

17. A method of controlling an optical display device having an optical modulator that has a plurality of pixels whose optical propagation characteristics can be controlled independently and a luminance adjusting element that has a plurality of pixels whose optical propagation characteristics can be controlled independently, the pixels in the optical modulator and the pixels in the luminance adjusting element being arranged to optically correspond at m:n, m and n being integers and m<n or n>m, the device modulating light from a light source through the optical modulator and the luminance adjusting element and displaying an image, the method, comprising:

calculating an average value or weighted average value of color component values on a color-basis in pixel values corresponding to the n pixels based on the display image data;

selecting a luminance value corresponding to each of the pixels in the optical modulator among luminance component values in the pixel values corresponding to the n pixels based on the display image data;

determining an optical propagation characteristic of each of the pixels in the optical modulator based on a result of calculating in the average value calculating and a result of selection by the luminance selecting; and determining a control value for each the pixels in the optical modulator based on the optical propagation characteristics determined in the optical propagation characteristic determining.

18. A method of controlling an optical display device having an optical modulator that has a plurality of pixels whose optical propagation characteristics can be controlled independently and a luminance adjusting element that has a plurality of pixels whose optical propagation characteristics can be controlled independently, the pixels in the optical modulator and the pixels in the luminance adjusting element being arranged to optically correspond at m:n, m and n being integers and m<n or n>m, the device modulating light from a light source through the optical modulator and the luminance adjusting element and displaying an image, the method, comprising;

converting RGB values corresponding to n pixels in the luminance adjusting element corresponding to m pixels in the optical modulator into first pixel values in which the luminance component and color components of the RGB values are separated based on the display image data having pixel values including RGB values;

calculating an average value or weighted average value of the color component values on a color-basis among the first pixel values corresponding to the n pixels;

selecting luminance values corresponding to the m pixels in the optical modulator from the luminance component values among the first pixel values corresponding to the n pixels;

converting second pixel values into RGB values, the second pixel values including a result of calculating in the average value calculating and a result of selection in the luminance selecting;

determining provisionally an optical propagation characteristic of each of the pixels in the luminance adjusting element;

determining an optical propagation characteristic of each of the pixels in the optical modulator based on the optical propagation characteristic provisionally determined in the optical propagation characteristic provisionally determining and a result of converting in the second pixel value converting;

determining a control value for each of the pixels in the optical modulator based on the optical propagation characteristic determined in the first optical propagation characteristic determining;

determining an optical propagation characteristic of each of the pixels in the luminance adjusting element based on the display image data; and determining a control value for each of the pixels in the luminance adjusting element based on the optical propagation characteristic determined in the second optical propagation characteristic determining.

19. A method of controlling an optical display device that has a plurality of pixels whose optical propagation characteristics can be controlled independently and a luminance adjusting light source that has a plurality of light sources whose luminance can be adjusted independently, the pixels in the optical modulator and the light sources in the luminance adjusting light source being arranged to optically correspond at m:n, m and n being integers and m<n or n>m, the device modulating light from the luminance adjusting light source through the optical modulator and displaying an image, the method, comprising:

calculating an average value or weighted average value of color component values on a color-basis in pixel values corresponding to the n pixels based on the display image data;

selecting a luminance value corresponding to each of the pixels in the optical modulator among luminance component values in the pixel values corresponding to the n pixels based on the display image data;

determining the optical propagation characteristic of each of the pixels in the optical modulator based on a result of calculating in the average value calculating and a result of selection in the luminance selecting; and determining a control value for each pixel in the optical modulator based on the optical propagation characteristics determined in the optical propagation characteristic determining.

20. A method of controlling an optical display device that has a plurality of pixels whose optical propagation characteristics can be controlled independently and a luminance adjusting light source that has a plurality of light sources whose luminance can be adjusted independently, the pixels in the optical modulator and the light sources in the luminance adjusting light source being arranged to optically correspond at m:n, m and n being integers and m<n or n>m, the device modulating light from the luminance adjusting light source through the optical modulator and displaying an image, the method, comprising:

converting RGB values corresponding to n light sources in the luminance modulating light source corresponding to m pixels in the optical modulator into first pixel values in which the luminance component and color components of the RGB values are separated based on display image data having pixel values including RGB values;

calculating an average value or weighted average value of the color component values on a color-basis among the first pixel values corresponding to the n pixels;

selecting luminance values corresponding to the m pixels in the optical modulator from the luminance component values among the first pixel values corresponding to the n pixels;

converting second pixel values including a result of calculating in the average value calculating and a result of selection in the luminance selecting;

determining provisionally luminance of each of the light sources in the luminance modulating light sources;

determining an optical propagation characteristic of each of the pixels in the optical modulator based on the luminance provisionally determined in the luminance provisionally determining;

determining a control value for each of the pixels in the optical modulator based on the optical propagation characteristic determined in the first optical propagation characteristic determining;

determining luminance of each of the light sources in the luminance adjusting light source based on the display image data; and determining a control value for each of the light sources in the luminance modulating light source based on the luminance determined by the luminance determining.

* * * * *